May 19, 1953     H. G. CROUCHER     2,639,017
MACHINE FOR PRODUCING TYPE FACED
IMPRESSIONS IN OR FOR PRINTING

Filed March 7, 1950                                  29 Sheets-Sheet 1

Inventor,
Henry G. Croucher
by Hall & Houghton,
Attorneys.

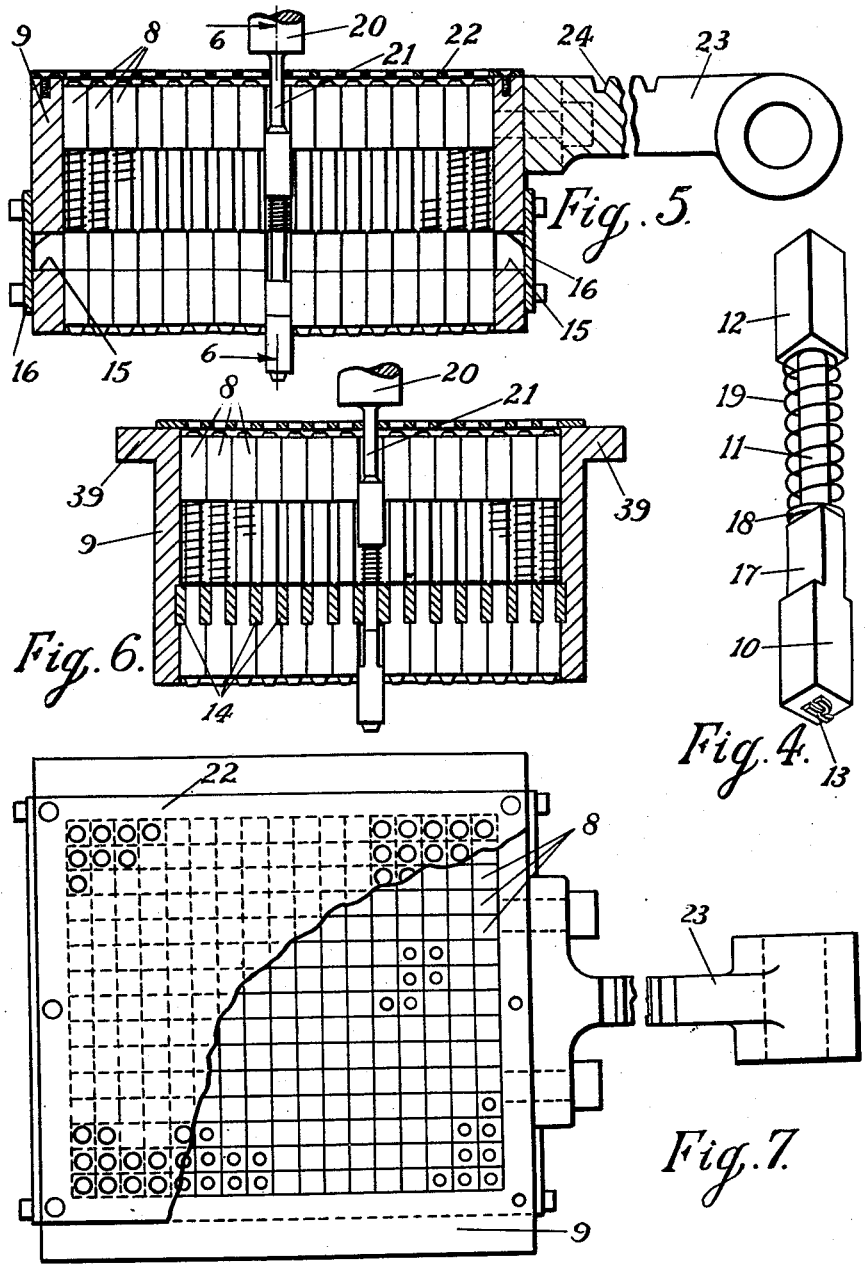

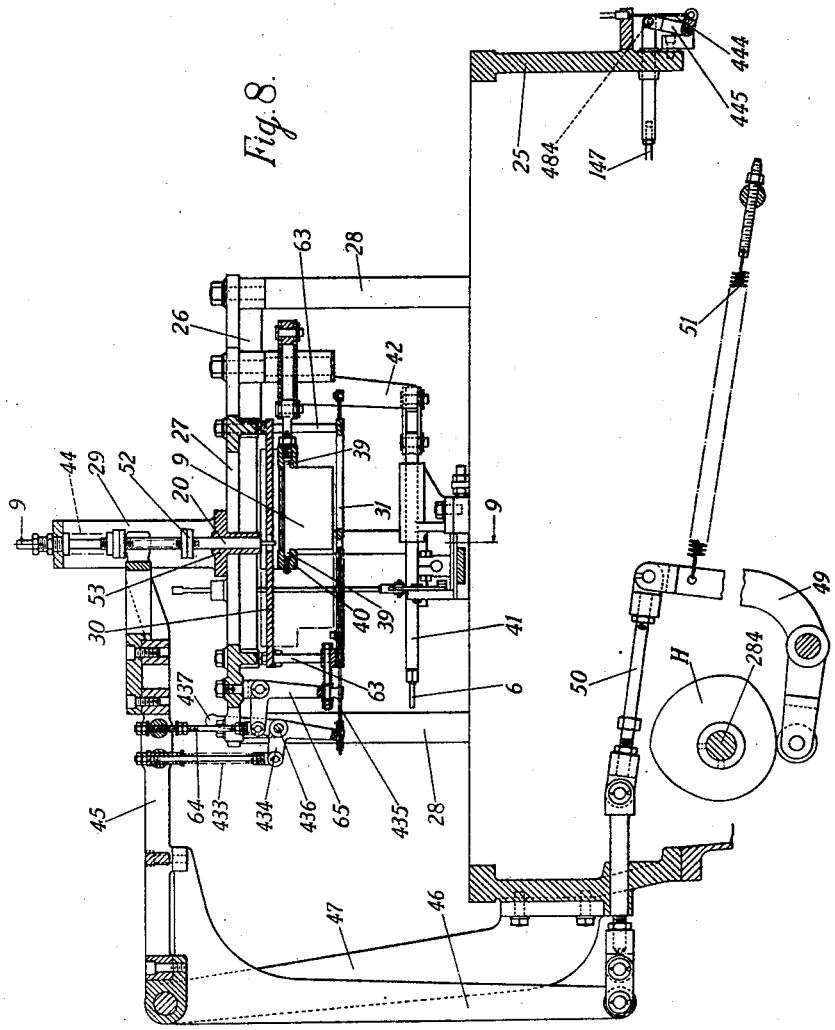

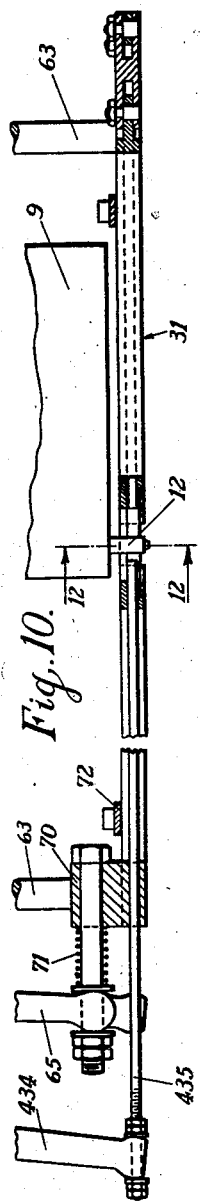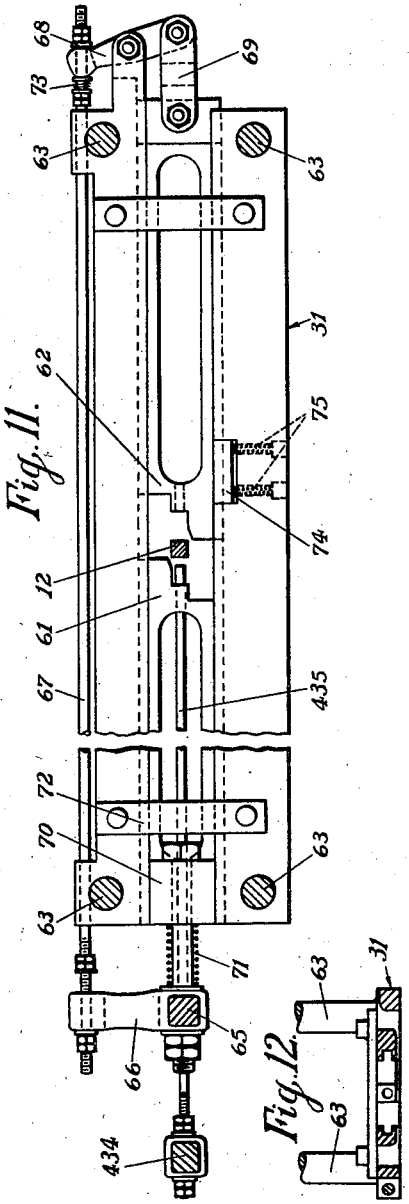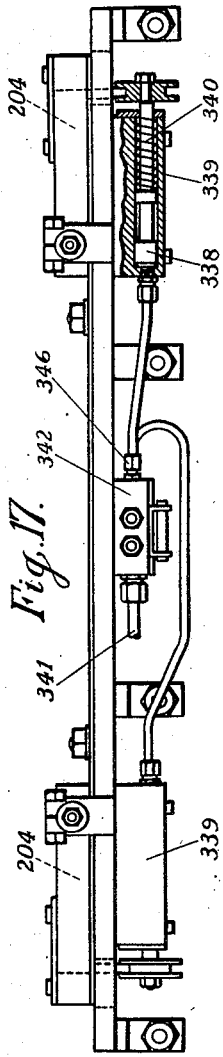

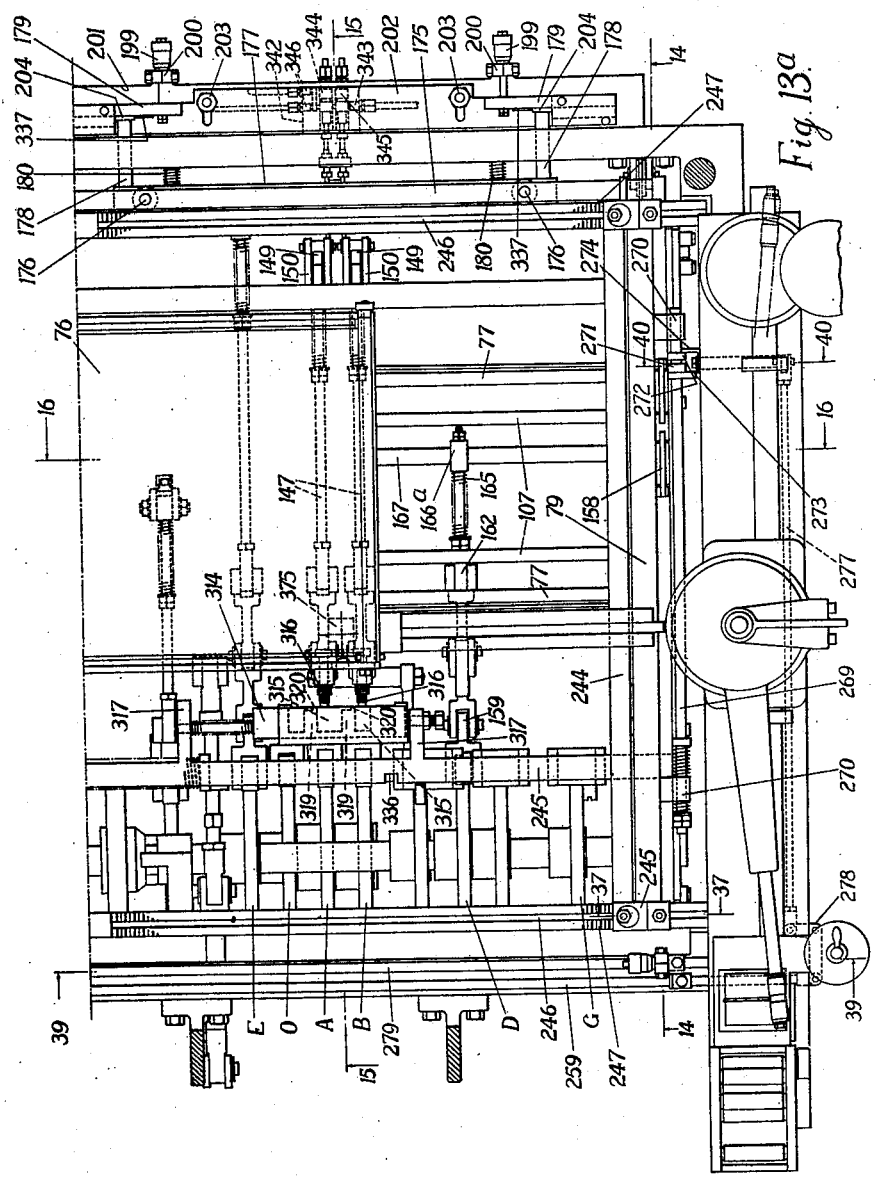

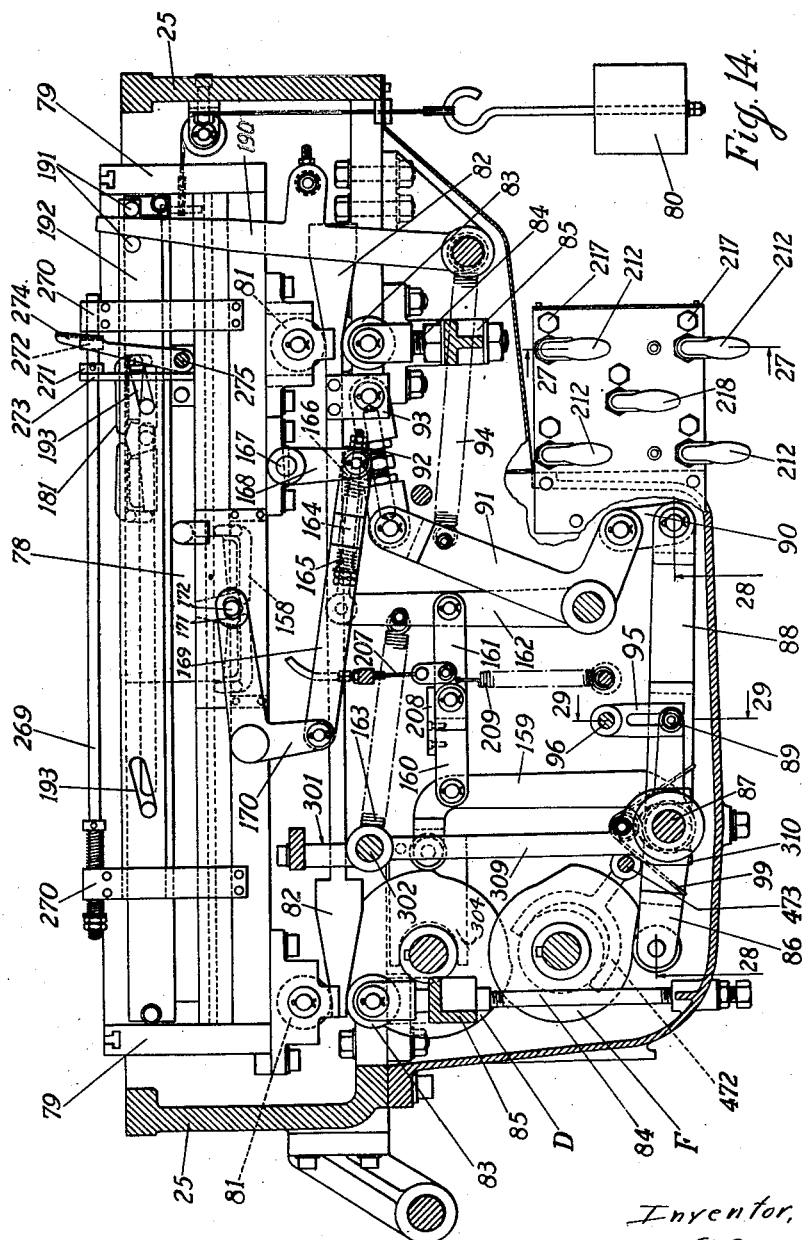

May 19, 1953

H. G. CROUCHER 2,639,017

MACHINE FOR PRODUCING TYPE FACED
IMPRESSIONS IN OR FOR PRINTING

Filed March 7, 1950

Inventor,
Henry G. Croucher,
by Hall & Houghton
Attorneys.

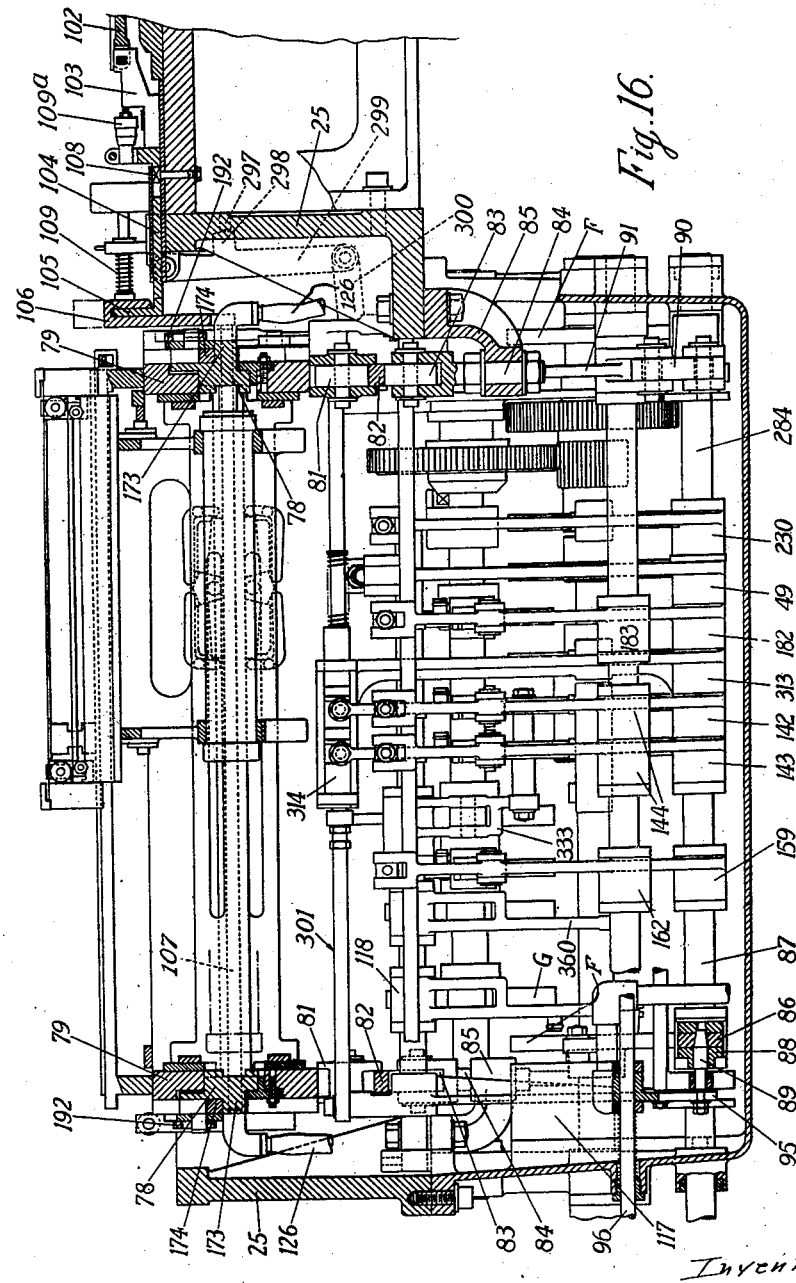

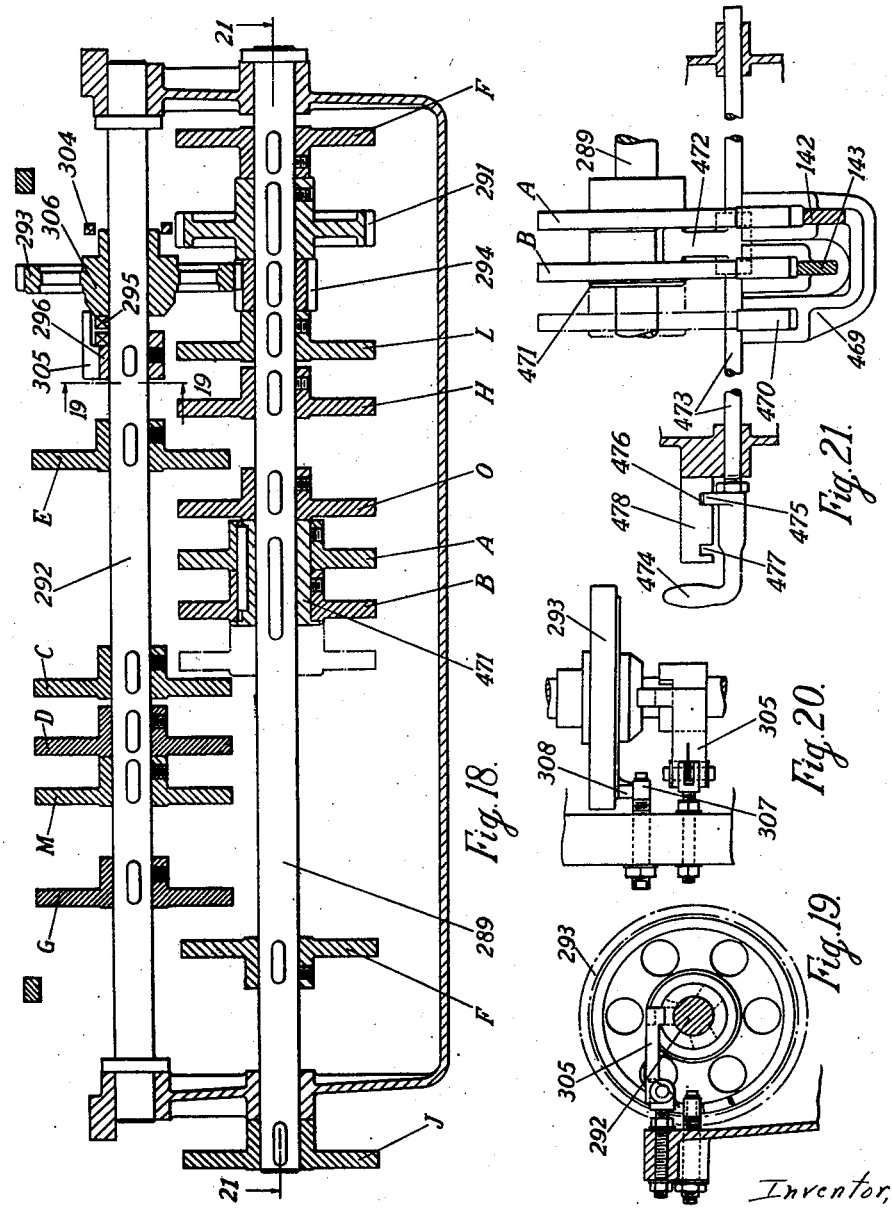

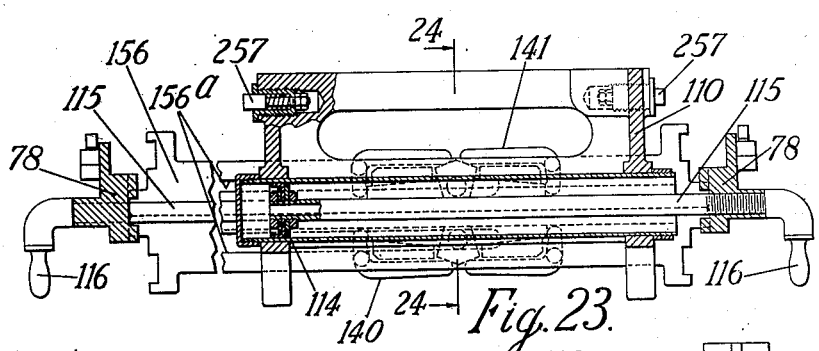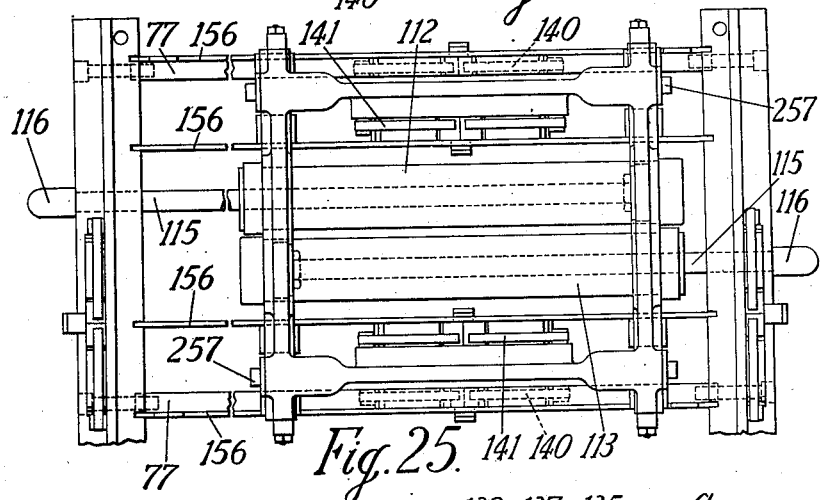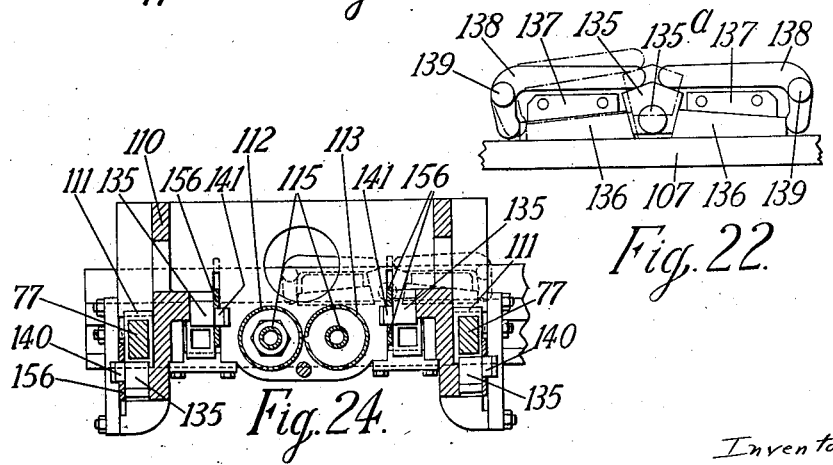

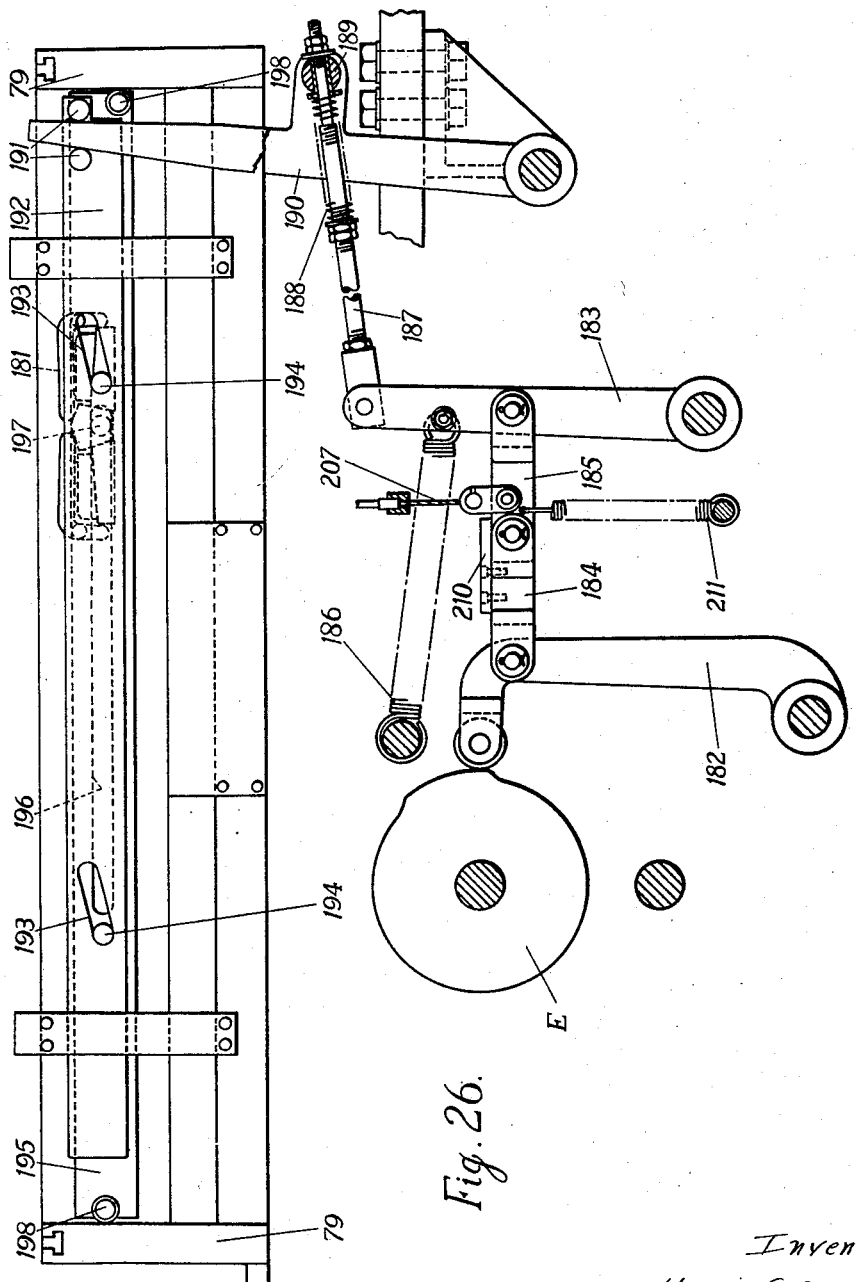

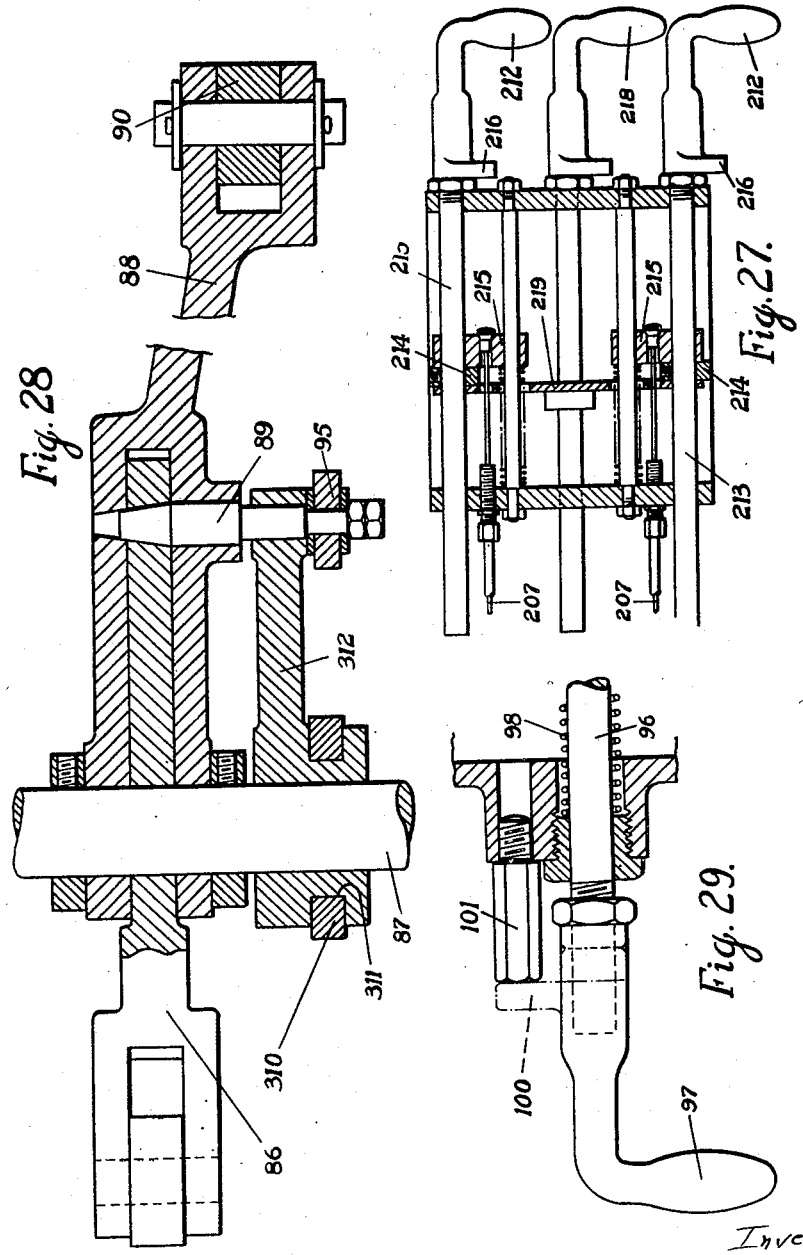

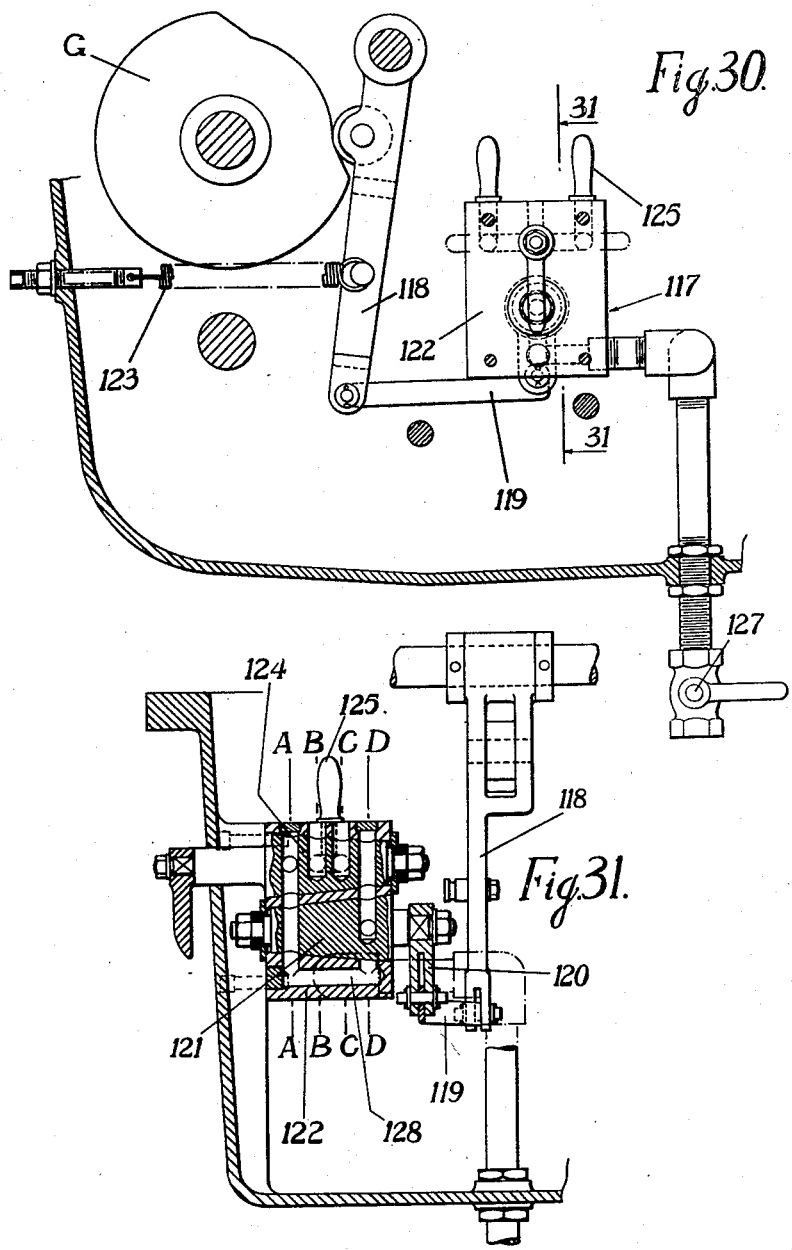

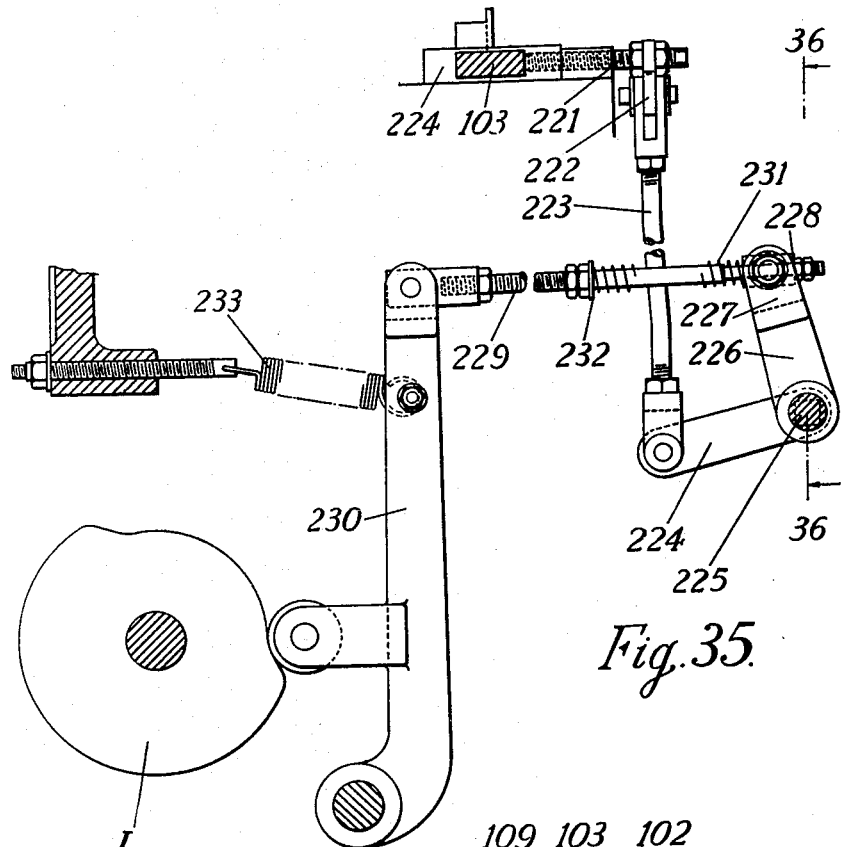
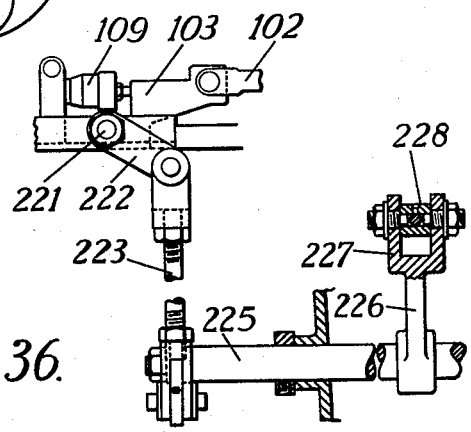

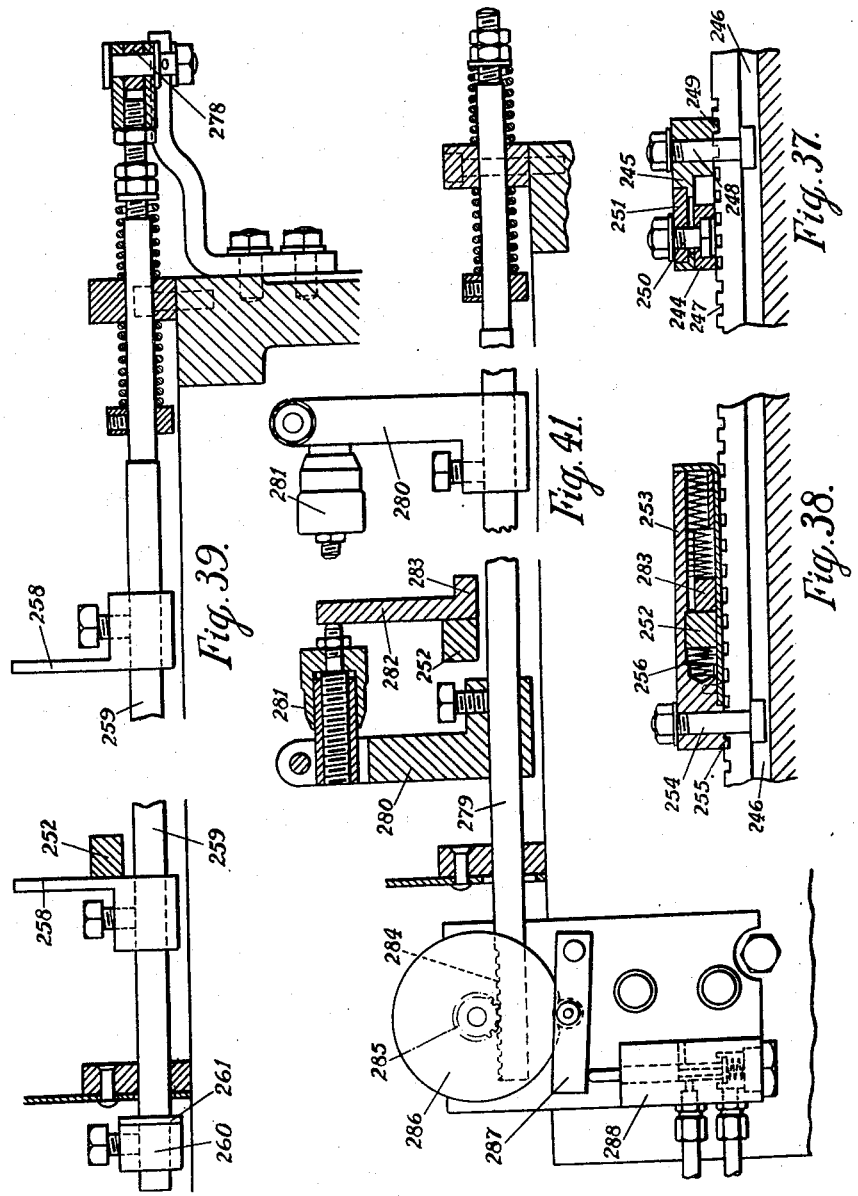

May 19, 1953 H. G. CROUCHER 2,639,017
MACHINE FOR PRODUCING TYPE FACED
IMPRESSIONS IN OR FOR PRINTING
Filed March 7, 1950 29 Sheets-Sheet 20

Inventor,
Henry G. Croucher,
by Hall & Houghton
Attorneys.

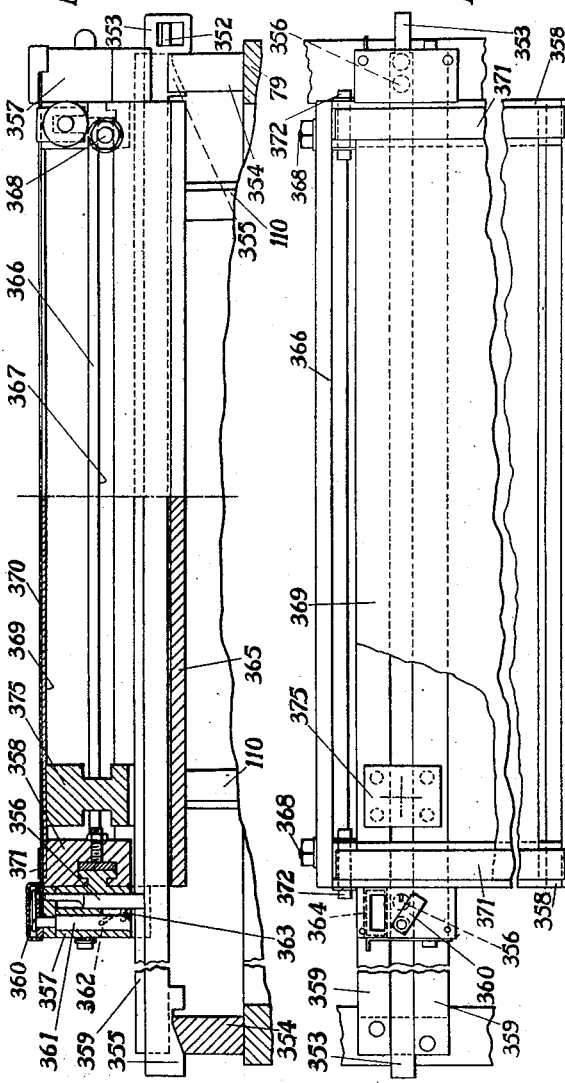

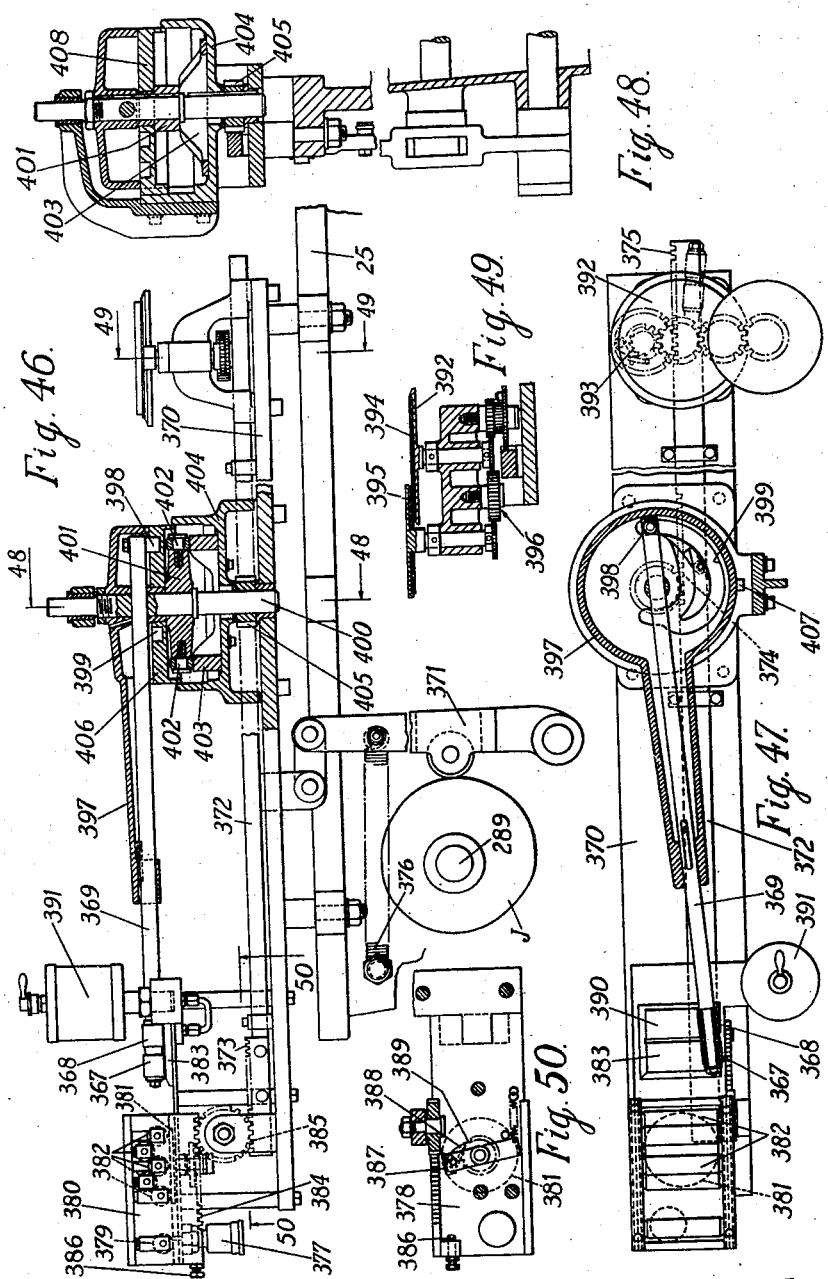

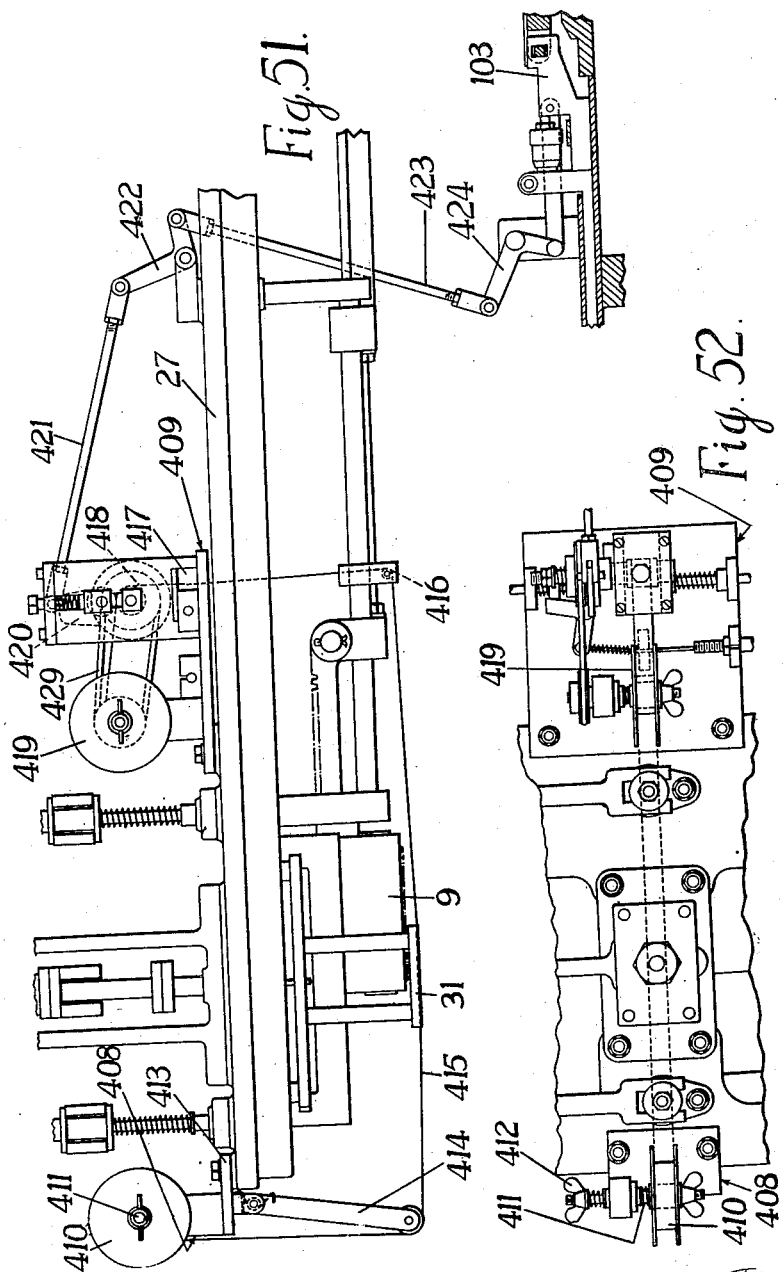

May 19, 1953     H. G. CROUCHER     2,639,017
MACHINE FOR PRODUCING TYPE FACED
IMPRESSIONS IN OR FOR PRINTING
Filed March 7, 1950     29 Sheets-Sheet 24
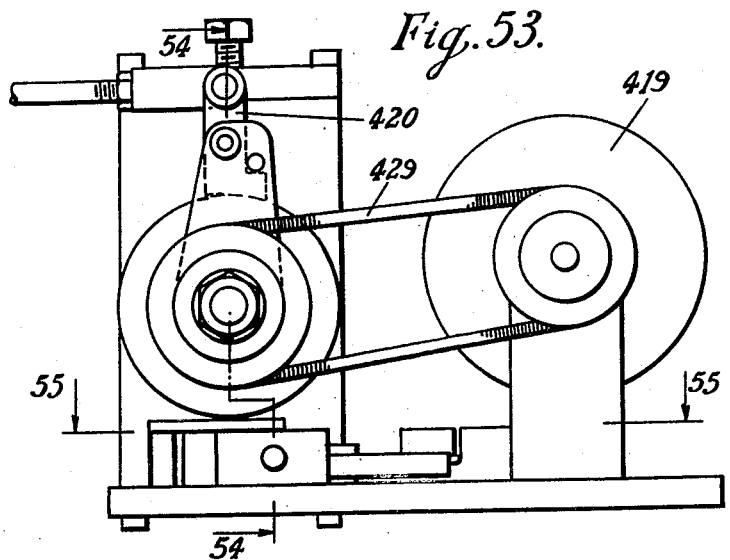
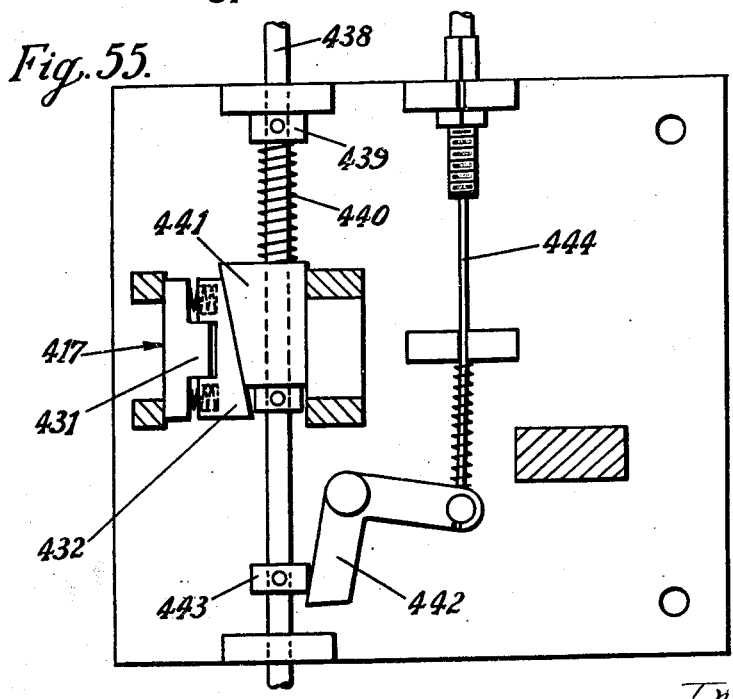
Inventor,
Henry G. Croucher,
by Hall & Houghton,
Attorneys.

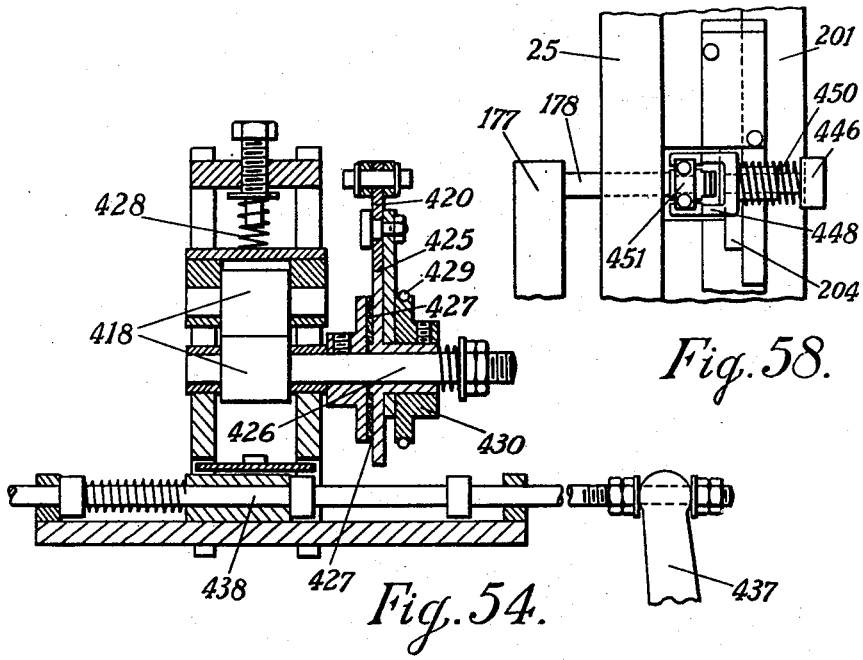
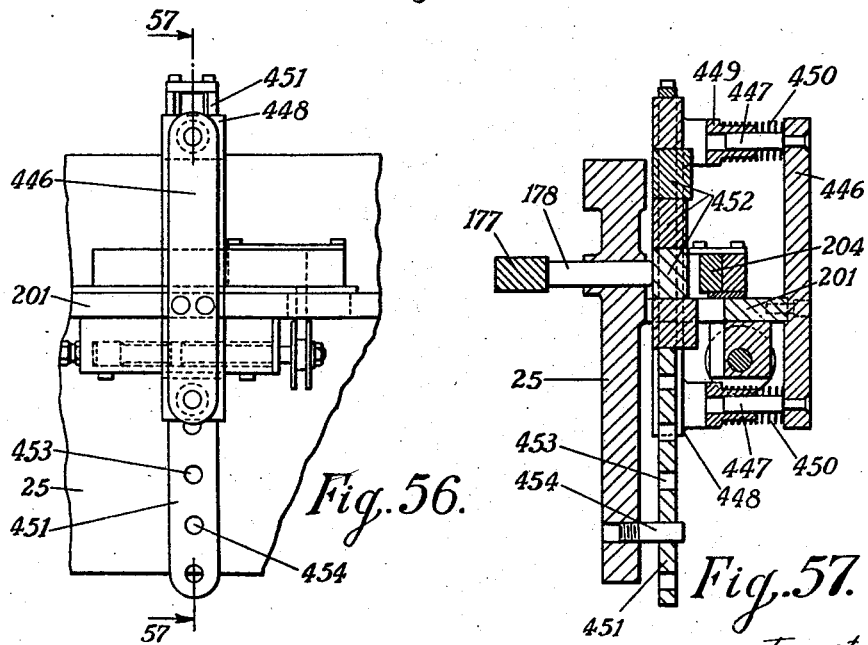

May 19, 1953  H. G. CROUCHER  2,639,017
MACHINE FOR PRODUCING TYPE FACED
IMPRESSIONS IN OR FOR PRINTING
Filed March 7, 1950                29 Sheets-Sheet 26
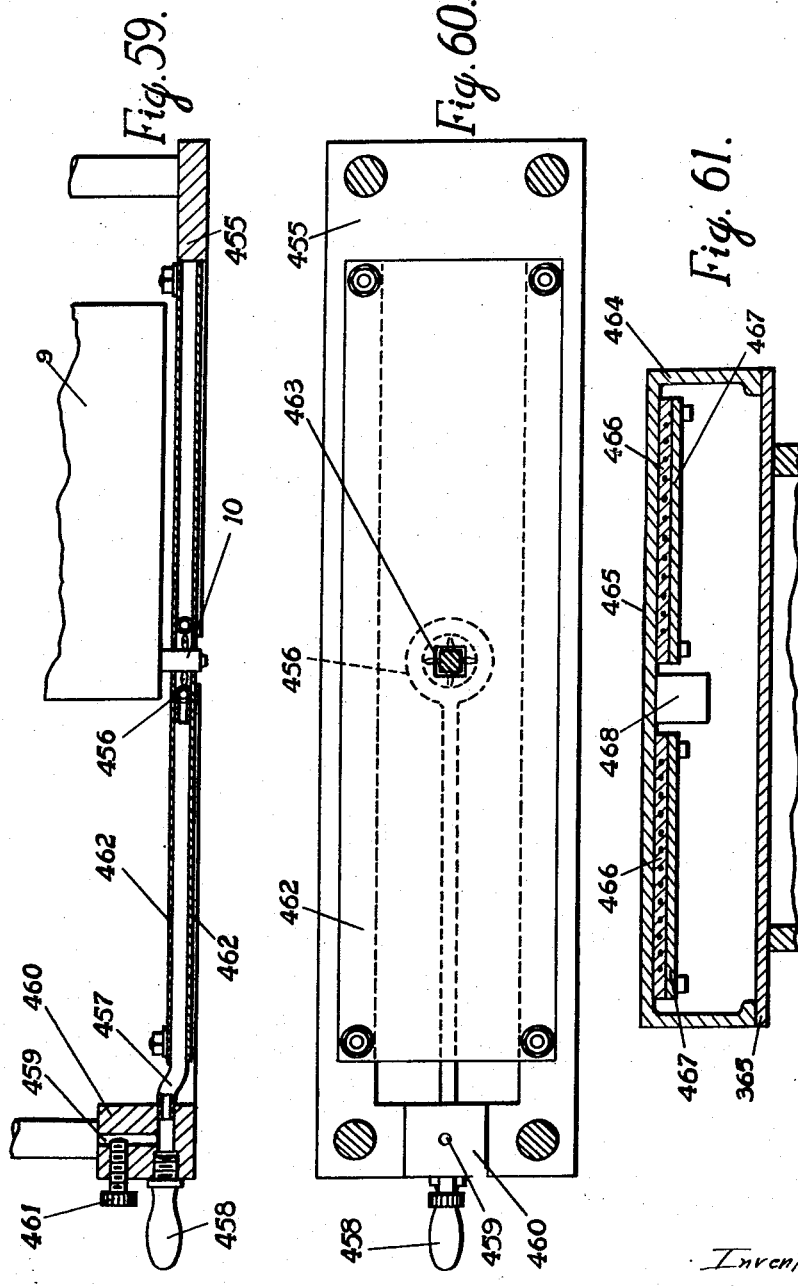
Inventor,
Henry G. Croucher,
by Hall & Houghton,
Attorneys.

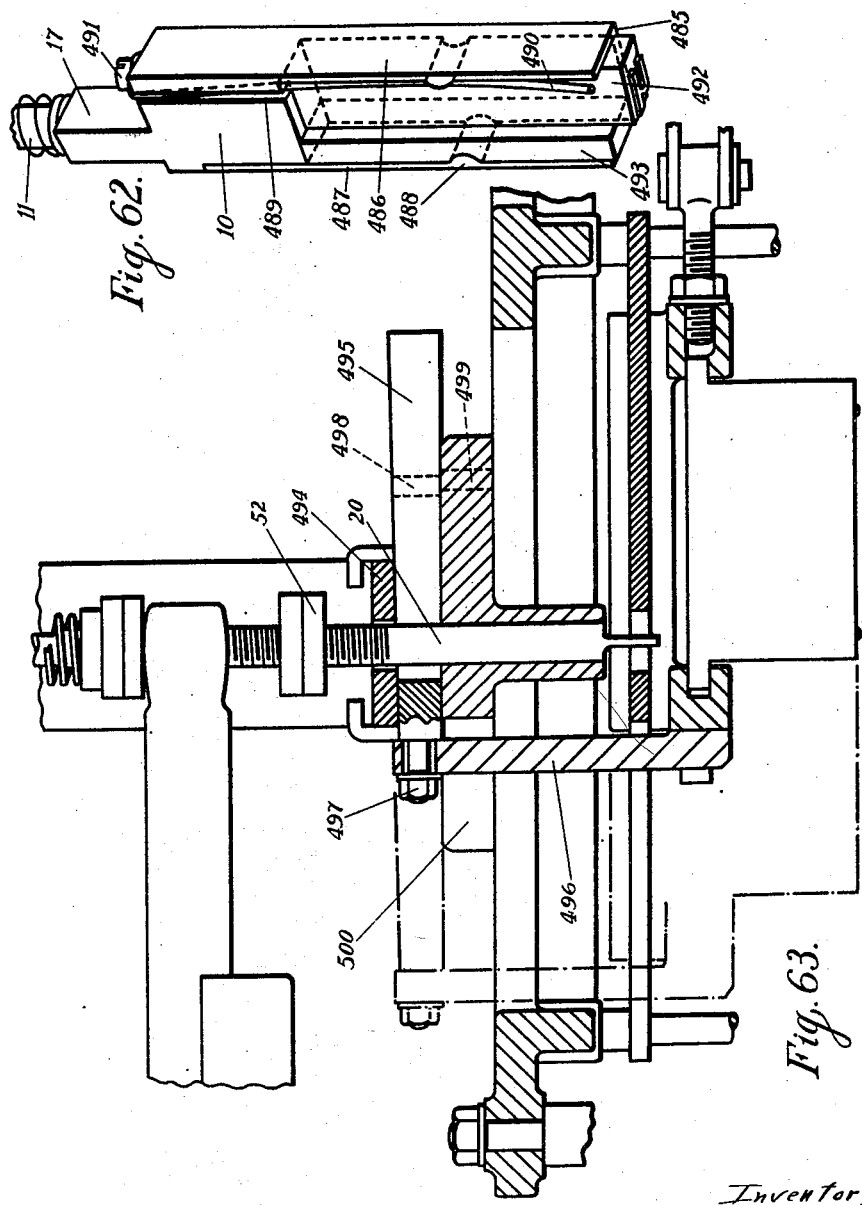

Fig. 64.

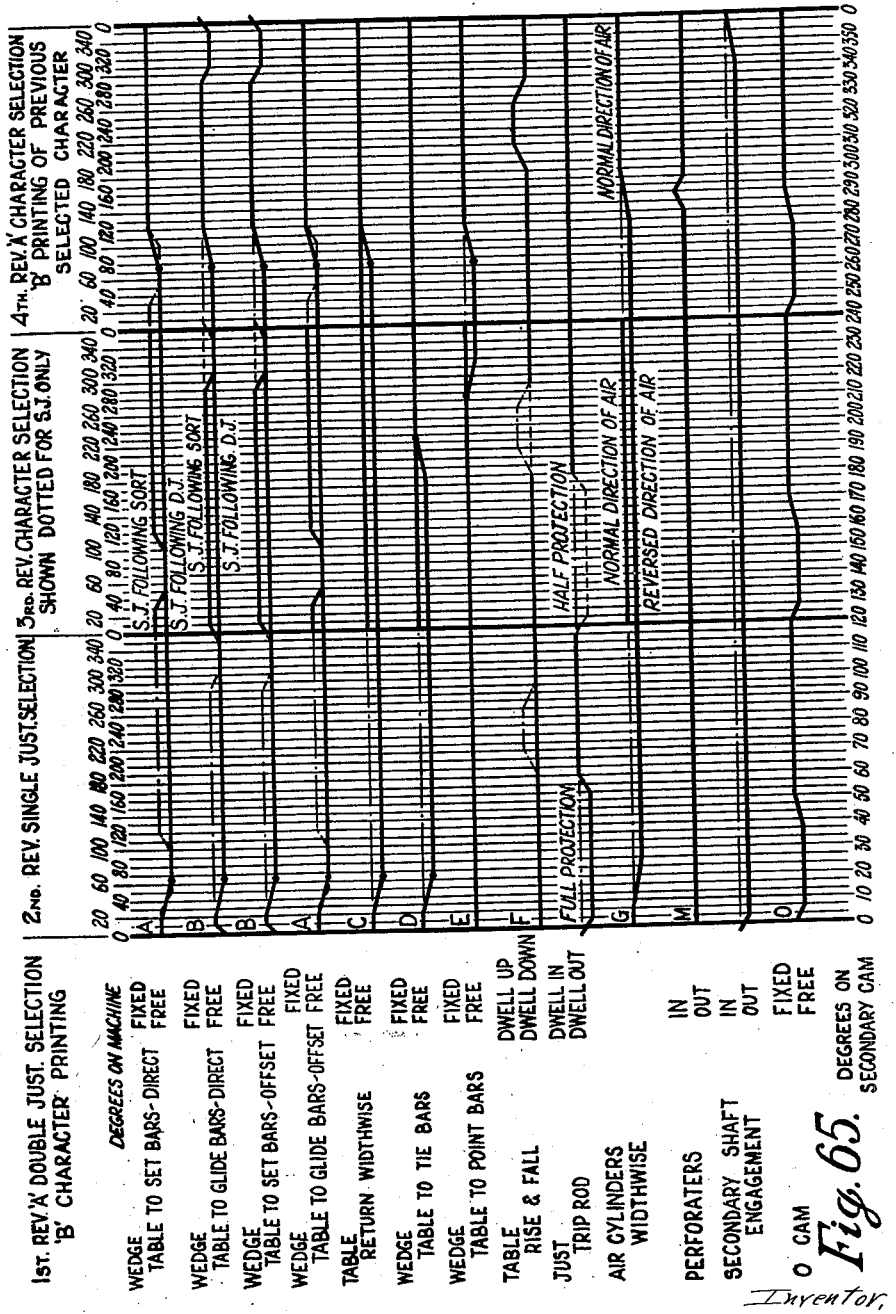

Patented May 19, 1953

2,639,017

UNITED STATES PATENT OFFICE 2,639,017

MACHINE FOR PRODUCING TYPE FACED IMPRESSIONS IN OR FOR PRINTING

Henry George Croucher, Beccles, England, assignor to William Clowes & Sons Limited, Beccles, England Application March 7, 1950, Serial No. 148,132
In Great Britain March 12, 1949

38 Claims. (Cl. 197—2)

This invention has for its main object to provide a machine capable of producing a wide variety of type faced impressions, contacts, or characters including printed impressions or characters in ink or otherwise upon paper or other material, and impressed or character bearing surfaces which may themselves be employed as printing surfaces or in the preparation of printing surfaces as described hereinafter. A further object is to provide a machine for the above purposes which can be used in conjunction with, or incorporated in, known forms of composing machines, and more particularly with composing machines of the single-type or single letter class. Other objects and advantages of the invention will appear from the following description. It is to be understood that the impressions or characters to be produced include not only the usual letters and numerals but also any required symbols and other forms such as the bars and notes in printed music, Morse and Braille symbols, formulae, foreign languages, decorative material, and the like.

The invention comprises a plurality of typeface carrying elements or dies, or elements capable of being used in the formation of individual characters, arranged in a support or casing, supporting means for a surface capable of receiving impressions or capable of having characters formed thereon from the aforesaid elements, and means for effecting relative movement between the supporting means and the element support or casing for producing an impression or character corresponding to the selected element at a predetermined or desired position on the receiving surface to form spaced lines or patterns of characters.

The invention also comprises a plurality of type-face carrying elements or dies in a holder or casing arranged for individual displacement to advance any one of the type faces beyond the plane of the remainder and means for temporarily effecting such displacement of a selected element, supporting means for an impression receiving surface, and means for effecting relative movement between the supporting means and the holder or casing for producing an impression of the selected die at a predetermined or desired position on the receiving surface.

The invention also comprises an arrangement as set forth in either of the two preceding paragraphs in which the element or die support or holder is movable in the plane of the elements to bring a selected element to a predetermined position, and the supporting means or table for the impression or character receiving surface is movable in a parallel plane to bring a desired point on said surface opposite the aforesaid predetermined position. According to a further feature of the invention, means is provided for moving the supporting means or table transversely to its plane for producing the impression and the type-face carrying element or die is maintained in position for this purpose. The preliminary displacement of the selected die is preferably effected by a plunger device.

According to a further feature of the invention, the support or holder for the die or character elements is displaceable for the positioning of a selected element by pneumatically actuated means controlled from a perforated strip previously prepared on a composing machine, and such means is preferably similar to the mechanism employed for the positioning of the matrix case in known single-letter type-casting machines. In a preferred arrangement, the existing matrix case positioning mechanism of a known machine is utilised for this purpose, as hereinafter described. Alternatively the holder or casing may be displaced under the control of other forms of mechanism, for example, a keyboard for this purpose may be combined with the machine.

The invention further comprises the provision of means controlling displacements of the supporting means or table for the impression receiving surface with respect to a plane in such a manner that the successive impressions are correctly positioned and spaced in lines, such control being preferably effected from a previously prepared perforated strip through the medium of pneumatically actuated mechanisms, and the impressions being produced by a transverse or vertical movement of the supporting means or table as previously described.

According to a further feature of the invention, the positioning displacements of the supporting means or table are controlled by utilising the existing mechanism on single-type composing machines employed for line collection.

In a convenient arrangement according to the invention, a table for the impression surface is slidably supported upon a set of bars which are connected at their ends by tie bars which are slidably engaged in grooves or slots in a rising and falling frame, the latter being vertically movable in an outer fixed frame by cam or other means. The arrangement is such that the table can be moved to any desired position in a horizontal plane by sliding on its supporting bars and by sliding of the tie bars in the frame.

means is also provided for locking the table in the position to which it is displaced for impression purposes, and for subsequently unlocking such means to permit displacement of the table to the next position. Locking may be effected by wedges which are actuated by cam or other means operated in the desired sequence and appropriately related to the movements of the table. Means is provided for manually interrupting the rising and falling movements of the table.

In a convenient arrangement according to the invention, movements of the table in line length direction are effected by pneumatic or other means and controlled by previously set stop means. According to a further feature of the invention, setting of the table in the required position is effected with the aid of sizing bars which are pushed into the table to an extent appropriate to the determination of the subsequent table displacement and clamped to the table. Setting of the table in line depth direction is effected with the aid of bars which can be displaced relative to the tie bars to an extent appropriate to the determination of the subsequent table displacement and clamped to the said tie bars. A micrometer arrangement is provided for setting the relative displacement of the said bars.

According to a further feature of the invention, table movement in line depth direction is determined with the aid of abutments in conjunction with packing pieces or leading bars which are engaged when the table moves. The said leading bars may have portions of reduced thickness and be displaceable by pneumatic means controlled by the known composing machine to vary the table travel.

According to a further feature of the invention, means including an interposed member having two or more packing pieces or gauges of different thicknesses is adjustably mounted and arranged to determine the table travel according to the selected thickness interposed. Such means can be used alone or in conjunction with the adjustable micrometer arrangement referred to above.

It is preferred to provide means engageable by the table when moving in line length direction for interrupting the drive of the machine when the table reaches a predetermined position.

According to a further feature of the invention means is provided for effecting positioning of the lines of impressions comprising a displaceable justification frame actuated by the trip rod of the known composing machine and arranged so that during the single justification operation, all the wedge mechanisms are clamped and the operation of the table rise and fall mechanism is interrupted. Also, during the double justification operation, the wedge mechanisms are unclamped in succession, the table rise and fall mechanism is interrupted, and the table operating air cylinders are reversed so that the table is returned to starting position for a new line.

According to a further feature of the invention, as applied to the production of impressions of the kind required in gold blocking for example, means such as a gas flame is provided for heating the face end of the displaced or projected die.

A further feature of the invention comprises the provision of means for inking the face of the die preparatory to the production of an ink impression on paper or the like, and subsequently cleaning the inked die face. Such means may comprise a pivoted arm carrying inking and cleaning devices such as rollers and movable over the face of the projected die by mechanism which is co-ordinated with the movement of the plunger device which displaces the die.

It is a feature of the invention that the depth of impression produced can be widely varied, since this depends upon the relative transverse movement between the die and the table supporting the impression surface, and such movement is readily controllable by the use of suitable cam or equivalent mechanism to effect the desired motion, or the impression surface may be itself adjustable such as by underlying sheets of different thicknesses. In this way a wide variety of typographical printing surfaces may be produced. Thus intaglio printing surfaces may be made by impressing a metal plate with ink (i. e. depositing ink to form characters) and subsequently etching the same, or by direct etching using a die to which acid has been applied or by impressing through an acid impregnated ribbon to form the basis of a subsequent treatment. Also suitable dies may be used to make a stencil plate by supporting an appropriate thin sheet of metal upon a resilient surface. Impressions may also be made with a suitable chemical upon a sensitive surface which can be developed photographically. Also sheets or strips may be perforated in any desired manner.

Any desired smooth or plane printing surface may also be produced, e. g. a litho plate for direct or offset process, by impressing or depositing with suitable ink on a prepared metal plate or rubber sheet respectively or by photographic means.

Relief typographical surfaces may also be produced in a number of ways. Thus a suitably impressed light-sensitive sheet may be photographically developed and subsequently used in the production of a process block, or a thin metal plate may be embossed to provide a relief surface on the underside thereof. By using heated or unheated dies with a waxed plate, a surface may be produced which can subsequently be etched or may form the basis of an electrotype shell. Also a glutinous ink can be employed in conjunction with a prepared chalked surface, the chalk being then removed and the impression treated with alkaline silicate to provide a mould suitable for electrotyping. Also wet or dry flong may be impressed, and a type metal plate obtained therefrom. Instead of flongs, the impression may be made in relatively soft materials such as lead, wax, Celluloid, or suitable thermo-plastic resins.

Also direct impressions may readily be made as in gold or like blocking or blind blocking upon any suitable material. For gold and like blocking the prepared leaf or pigment is provided on a ribbon base and suitable means is provided for feeding the ribbon beneath the dies.

Impressions in ink or the like may also be produced on paper or any other suitable material either by direct inking of the die or by the interposition of a medium such as carbon ribbon or other impregnated or coated ribbon or paper between the die and the impression receiving surface, or by the use of chemically treated paper which can be subsequently developed photographically. The methods employed for obtaining an impression may also include mere contact between the type faced element and a prepared surface material without inking or applying other substance to the type face, the receiving surface being of such a character or so treated that as a result of such contact a chemical or other change takes place which enables an impression to be subsequently developed. The impression may also be produced by a process wherein certain areas of paper or other material are electrically charged. For use in offset or like printing or for foreign languages reading right to left, the dies employed are cut or formed with the characters reversed and arrangements are provided for causing the table movements to take place in the reverse directions as compared with ordinary direct printing. Impressions may be made on transparent material of any suitable kind. It will be seen from the foregoing examples that the invention is capable of being applied to a wide variety of uses in the production of type faced and like impressions.

Other features of the invention will be described in the following description of one possible mode of carrying the invention into effect, as illustrated in the accompanying drawings, in which Figure 1 is an end elevation of a machine constructed according to the present invention for producing type faced impressions in or for printing and arranged as an attachment to a part of a single-type composing machine;

Figure 4 is a perspective view of one of the dies;

Figure 5 is an elevation, partly in section, of the die case with its attached operating arm;

Figure 6 is a section taken on the line 6—6 of Figure 5;

Figure 7 is a plan of the die case with its perforated cover shown partly broken away;

Figure 8 is a sectional elevation of the machine taken on the line 8—8 of Figure 2;

Figure 10 is a sectional elevation of the die clamp;

Figure 11 is a plan of the die clamp;

Figure 12 is a section taken on the line 12—12 of Figure 10;

Figures 13 and 13a are a plan of the machine with the bridge portion removed;

Figure 14 is a vertical section taken on the line 14—14 of Figure 13a;

Figure 15 is a vertical section taken on the line 15—15 of Figure 13a;

Figure 16 is a vertical section taken on the line 16—16 of Figures 13 and 13a;

Figure 17 is an elevation of the leading mechanism looking in the direction of arrow 17 in Figure 15;

Figure 18 is a section taken on the line 18—18 of Figure 15 showing the main and secondary cam shafts;

Figure 19 is a section taken on the line 19—19 of Figure 18;

Figure 20 is a plan view of Figure 19;

Figure 21 is a partial section taken on the line 21—21 of Figure 18;

Figure 22 is an end elevation of a wedge assembly;

Figure 23 is a vertical section of the table for supporting the impression receiving surface;

Figure 24 is a vertical section taken on the line 24—24 of Figure 23;

Figure 25 is a plan view of the table shown in Figure 23;

Figure 26 is an elevation of the drive mechanism for the point bar wedge mechanisms;

Figure 27 is a section taken on the line 27—27 of Figure 14;

Figure 28 is a section taken on the line 28—28 of Figure 14;

Figure 29 is a section taken on the line 29—29 of Figure 14;

Figure 30 is an elevation of the mechanism for reversing the table;

Figure 31 is a section taken on the line 31—31 of Figure 30;

Figure 35 is an elevation of the set blade clamping mechanism;

Figure 36 is a section on the line 36—36 of Figure 35;

Figure 37 is a section of the zero bar clamp taken on the line 37—37 of Figure 13a;

Figure 38 is a section of the stop bar clamp taken on the line 38—38 of Figure 13;

Figure 39 is a section of the operating bar taken on the line 39—39 of Figures 13 and 13a;

Figure 40 is a section taken on line 40—40 of Figure 13a;

Figure 41 is a section taken on the line 41—41 of Figure 13;

Figure 43 is a vertical section through the table;

Figure 44 is a plan view of the table;

Figure 45 is an elevation of the table;

Figure 46 is an elevation of the mechanism for inking and cleaning the impression dies;

Figure 47 is a sectional plan of the above mechanism;

Figure 48 is a section taken on the line 48—48 of Figure 46;

Figure 49 is a section taken on the line 49—49 of Figure 46;

Figure 50 is a section taken on the line 50—50 of Figure 46;

Figure 51 is an elevation of the ribbon feeding and take-off mechanism;

Figure 52 is a plan view of the ribbon feeding and take-off mechanism;

Figure 53 is an elevation of the ribbon take-off mechanism;

Figure 54 is a section taken on the line 54—54 of Figure 53;

Figure 55 is a section taken on the line 55—55 of Figure 53;

Figure 56 is an elevation of the adjustable leading mechanism;

Figure 57 is a section taken on the line 57—57 of Figure 56;

Figure 58 is a plan view of Figure 57;

Figure 59 is a vertical sectional elevation of the die heater assembly;

Figure 60 is a plan view of Figure 59;

Figure 61 is a section of a heated table box;

Figure 62 is a perspective view of the lower part of a modified form of die;

Figure 63 is a sectional elevation of a modified arrangement for controlling die ejection;

Figure 64 is a timing graph showing the operations of the various cams during a normal single revolution of the main cam shaft for effecting an impression;

Figure 65 is a timing graph showing the operation of the various cams during the three revolutions of the main cam shaft during double justification.

The invention will be described as applied by way of example in conjunction with certain parts of a single-type composing machine as known under the registered trade mark Monotype. Such machines are provided with a die case containing a number of matrices from which single type can be cast. The case is displaceable in a plane to bring a selected matrix over a mould and the matrix is held by a centering pin while molten metal is pumped into the mould to form the type. The movements of the case are controlled by pneumatically actuated means and the operation of these means is controlled by a perforated strip which has previously been made on a keyboard mechanism. The machine according to the present invention includes an attachment to the standard casting machine referred to above, from which are removed (1) the die case bridge including the normal die case, matrices, and centering pin ; (2) the mould; (3) the type metal melting and ejecting apparatus; and (4) the type collecting mechanism and galley.

Figure 2:
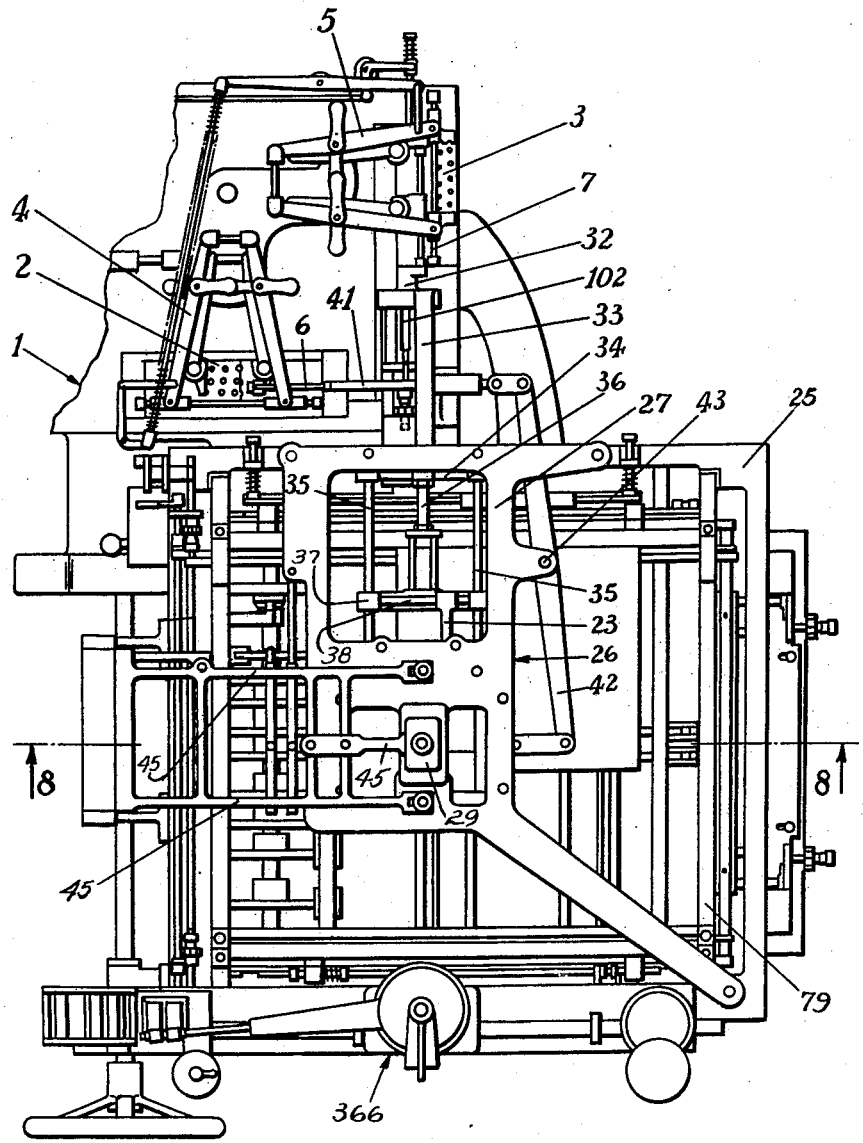
Figure 2 is a plan view of the machine showing the connections with the composing machine.

Figure 2 shows the machine in plan view, of which the part indicated at 1 is a part of the standard casting or composing machine including the pin blocks 2 and 3 and the two tong mechanisms 4 and 5 which operate draw rods 6 and 7.

In carrying the invention into effect according to one convenient mode as applied to a composing machine as referred to above, a similar form of die case is employed as illustrated in Figures 5, 6 and 7, and instead of matrices the required number of male dies 8 are arranged in rows within the case 9, the dies being provided with the required type or other faces. As an example 255 dies may be provided, some of which do not have type faces and are for spacing purposes, but the number may be widely varied according to requirements. Each die comprises an elongated metal member 10 as shown in Figure 4 having a reduced shank portion 11 and a head 12 which is in the form of a nut. A normal raised type face 13 or other character is formed on its lower face. A series of bars 14 extend across the die case and rest in slots 15 covered by plates 16. These bars are received in recesses 17 in the lower parts of the dies. Washers 18 loaded by springs 19 rest on the bars 14 and maintain the dies in withdrawn position. The dies can be individually displaced downwardly to cause the corresponding type face to project beyond the plane of the remainder, the amount of movement being generally chosen in accordance with the kind of impression required. Thus for producing an ink impression on paper the required movement need not exceed a few thousandths of an inch, whereas for other purposes a larger movement may be necessary. The dies are projected by a vertically movable projector 20 having a reduced plunger head 21. The top of the die case is closed by a perforated cover 22 and attached to one side of the case is an arm 23 formed with a rack 24. It will be understood that the dies may be otherwise formed and arranged and may if desired constitute holders for ordinary type. Thus for example the holder may have a spring side wall with a positioning block engaging the nick in the side of the type. The location in the horizontal plane of the projector 20 is fixed, the die case being carried in a frame which is capable of movement in the direction of the depth of the impressions and the die case is displaceable in the said plane in the direction of the width of the impressions.

Referring to Figures 1, 2, 8 and 9, the machine comprises a main frame 25 of rectangular box form upon which is supported a bridge 26 including a bridge plate 27 on legs 28. The die case 9 is carried by the bridge and is freely movable horizontally thereon. A support 29 for the die projector 20 is carried on the bridge plate 27, from which is suspended the guide plate 30 and the die clamping assembly 31. Movement of the die case in the direction of the width of the impressions, i. e. along the line of characters to be impressed, is effected by the existing tong mechanism 5. The draw rod 7 is connected to the existing cross slide 32, see Figures 2 and 9. An arm 33 connects the slide 32 to a slide 34 on guides 35. An adjustable rod 36 connects the slide 34 to a second slide 37 having lugs in which a removable rod 38 is fitted. The arm 23 of the die case is connected to this rod and is slidable therealong. The die case has flanges 39 supported in grooves in a cross slide 40 which permits the desired movements of the case.

Movement of the die case in the direction of the depth of the impressions is effected from the existing tong mechanism 4, the draw rod 6 of which is connected to a rod 41 linked to a lever 42 pivoted at 43. The other end of lever 42 is adjustably linked to the cross slide 40 which is slidable on the guide plate 30. It will be understood that the die case movements are effected by the tong mechanism and are controlled pneumatically in a well-known manner.

Projection of the selected die is effected by the projector 20, loaded by a spring 44, under the action of a bell crank lever 45, 46 pivoted on a bracket 47. The bell crank lever has three parallel arms 45 which are depressed by a cam H on shaft 284 acting through lever 49 and linkage 50, and are returned by a spring 51. The stroke of the projector 20 can be adjusted by means of lock nuts 52 which engage a fixed abutment 53.

Means is provided for locking the die case in selected position, comprising plungers 54 and 55 the lower ends of which are formed with teeth which mate respectively with teeth 24 in the die case arm 23, and with teeth 56 in the cross slide 40. The teeth on the plunger 54 are of sufficient width to allow of the required movement of the die case in the direction of the depth of the impressions. These teeth are formed in a member 57 slidable in grooves 58 formed in suitably spaced posts. The plungers 54 and 55 are actuated through springs 59 enclosed in housings 60 mounted on the arms 45, so that downward movement of these arms can continue after locking to permit actuation of the die projector.

Figure 9:
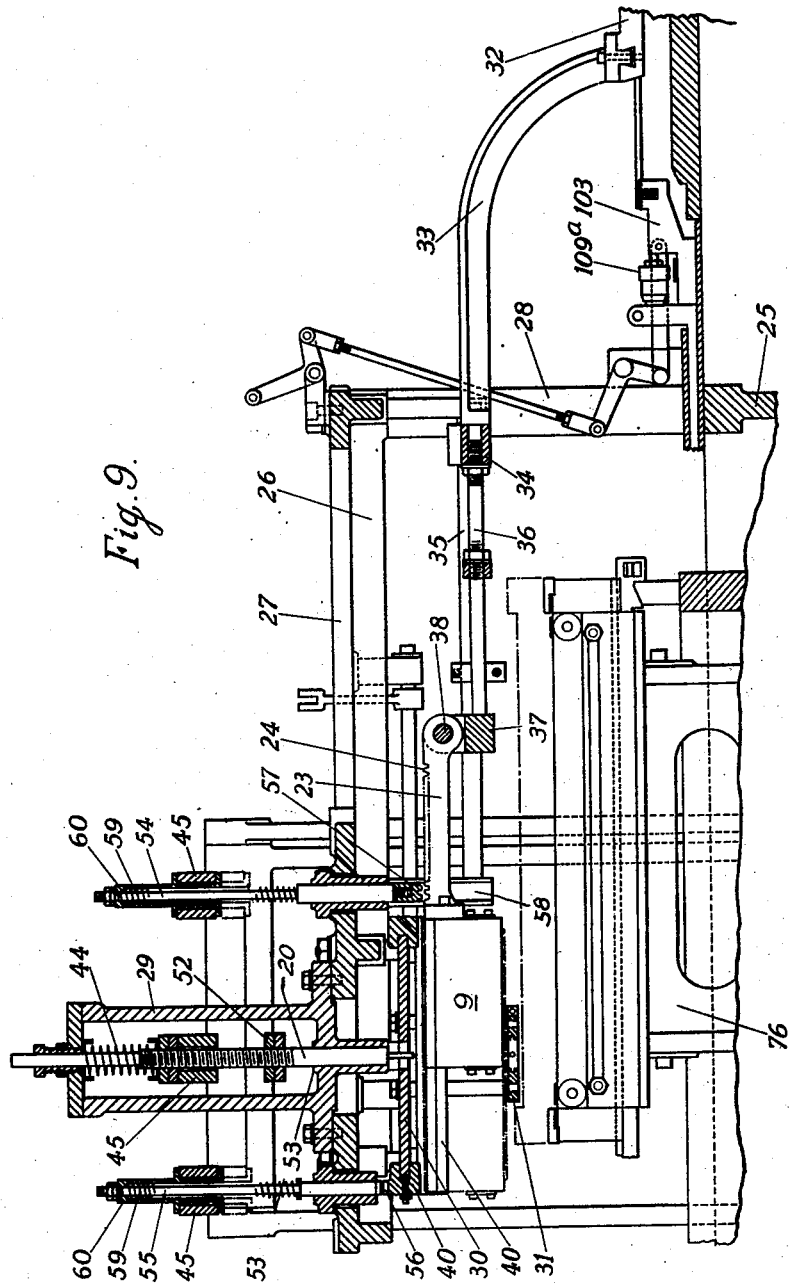
Figure 9 is a sectional elevation of the machine taken on the line 9—9 of Figure 8.

Means is provided for clamping the projected die and this mechanism is indicated at 31 in Figures 8, 11 and 9 and is shown in detail in Figures 10, 11 and 12. A pair of jaws 61, 62 are slidable horizontally in the plate framework 31 which is supported by posts 63, and are adapted to engage and clamp between them the projected die 12. A rod 64 (see Figure 8) actuates a bell crank lever 65 having a lateral extension 66 connected by a rod 67, pivoted lever 68, and link 69 to the sliding jaw 62. The jaw 61 carries a block 70 which is actuated by lever 65 through a spring 71. Actuation of the lever 65 by downward movement of the control arm 45 moves the jaw 61 inwardly until the block 70 comes against the stop 72, after which further movement of the lever moves the jaw 62 inwardly to clamp the die. The spring 71 is stronger than a spring 73 which is interposed between rod 67 and lever 68, and thus the block 70 will remain against its stop. A pad 74 loaded by springs 75 is provided to prevent chatter of the jaws.

Figure 1:
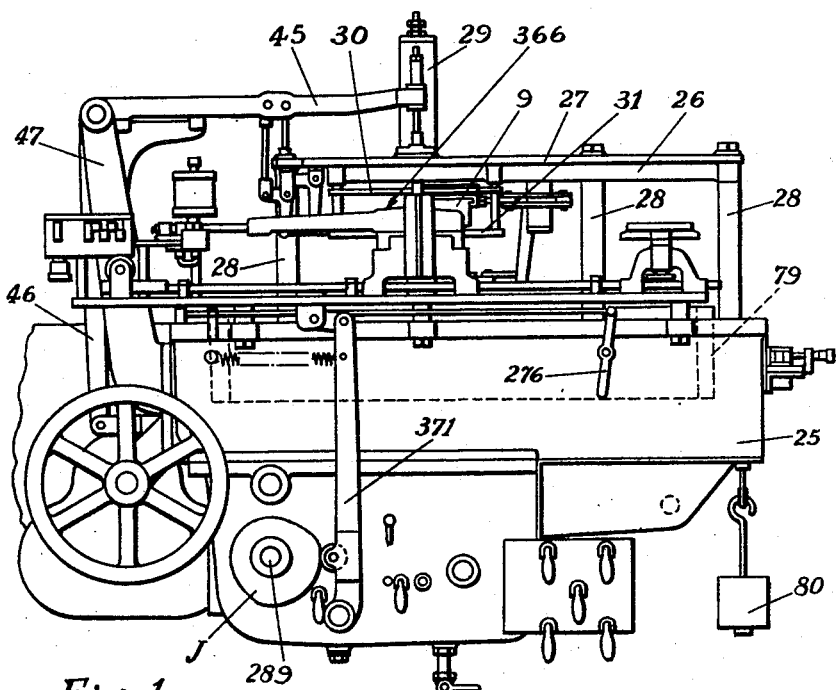
Figure 3:
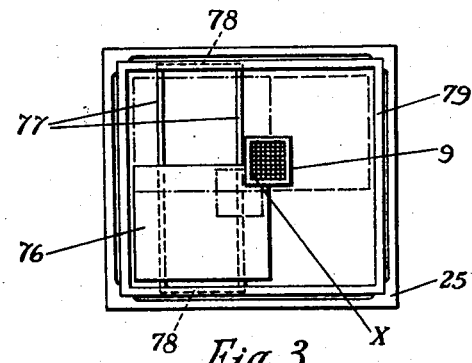
Figure 3 is a diagram showing in plan view the movements of the die case and of the table for the impression receiving surface during operation of the machine.

The impression receiving surface is secured upon a table supported below the die case and movable in a plane parallel to the plane of the die faces and also transversely thereto. The table is indicated at 76 in Figure 9. Referring to Figures 13, 13a, 14, 15 and 16, the table is slidable upon glide bars 77 which are connected at their ends to tie bars 78 lying at right angles to the glide bars, and these tie bars 78 run in grooves formed in opposite sides of a rectangular box frame 79, hereinafter referred to as the rising and falling frame. The arrangement is such that the table can be moved both longitudinally and transversely in a horizontal plane within the limits of the frame 79, the table sliding on the glide bars and the tie bars sliding in the frame according to the direction in which the table is displaced. The tie bars are returned to a suitable starting position by hand and the successive table movements for line depth are effected by a weight and cable arrangement, one of the weights being shown at 80 in Figure 14. The dimensions of the rising and falling frame 79 are such that any point on the impression surface can be brought beneath the selected die in the die case. This will be clear on reference to Figure 3 which illustrates diagrammatically two possible positions of the die case 9 and three positions of the table 76, the selected die being indicated at X.

The rising and falling frame 79 is arranged for vertical movements in the main frame structure 25. Four rollers 81, see Figures 14 and 16, are mounted underneath the frame 79 and rest on cam bars 82 which in turn rest on rollers 83 mounted on adjusting screws 84 located in brackets 85 secured to the main frame 25. Cams F actuate duplicate levers 86 fulcrumed on a shaft 87. Also fulcrumed on the said shaft is a bifurcated coupling lever 88 (see Figure 28) which is connected to the lever 66 by a tapered cross bolt 89. A link 90 connects the end of lever 88 to a bell crank lever 91 from the upper end of which an adjustable bolt 92 forms a connection with a block 93 attached to the cam bar 82. It will be understood that the above described lever and link arrangement is duplicated on either side of the rising and falling frame. Rotation of the cams F drives the cam bar 82 between the rollers 81 and 83 and thereby raises the frame 79 by the required amount. Return of the frame is ensured by a spring 94 attached to the bell crank lever 91, and the frame is suitably guided in the main frame 25.

Means is provided for interrupting the rise and fall movement of the frame 79 when desired independently of the operation of cam F. Slidably attached to the tapered bolt 89 is a fork 95, as seen in Figures 14 and 28, which is free to rotate upon the rod 96 but is fixed lengthwise thereon. The rod 96 carries a handle 97 as shown in Figure 29. By pulling the handle 97 outwardly against its spring 98 and rotating it through a right angle, the tapered bolt 89 can be withdrawn from the lever 86 so that the latter rocks freely without actuating lever 88. A spring 99 shown in Figure 14 prevents lever 86 from falling away from cam F. Also the handle 97 has a tongue 100 which can rest against a stop 101 when the handle is in withdrawn position to retain it therein.

After each impression it is necessary that the table should be moved in the direction of the line of impression over a distance depending upon the nature of the impression and its relation to previously made impressions. The mechanism employed for this purpose is similar to that which determines the width of type in a composing machine as referred to previously. Referring to Figures 2, 13, 13a and 16, the existing sizing rod 102 of such machine is connected to a set blade 103 which abuts a transfer bar 104 having a laterally extending upturned end 105. A set bar 106 is laterally slidable upon the upturned end 105 and to this are attached a pair of sizing bars 107 which run through the table and can be clamped thereto. In its normal position the transfer bar is held against a stop 108 by springs 109. The arrangement is such that the sizing bars 107 can be pushed into the table a distance corresponding to the exact width of the character impressed. This is initially effected by the aid of a micrometer 106a which can be opened to provide a gap between the set blade 103 and the transfer bar 104 equal to the em or width of the type face to be impressed. The sizing rod 102 moves in the operation of the machine towards the set blade 103 and is stopped leaving a gap equal to the width of the character. After the impression has been made, the table is unclamped from its supporting glide bars and moves in line direction until the transfer bar 104 is stopped by the set blade 103. The table is then clamped to the glide bars 77 and the sizing bars are unclamped so that the set blade 103 and transfer bar 104 are moved up to the stop 108 by the springs 109.

Figure 32:
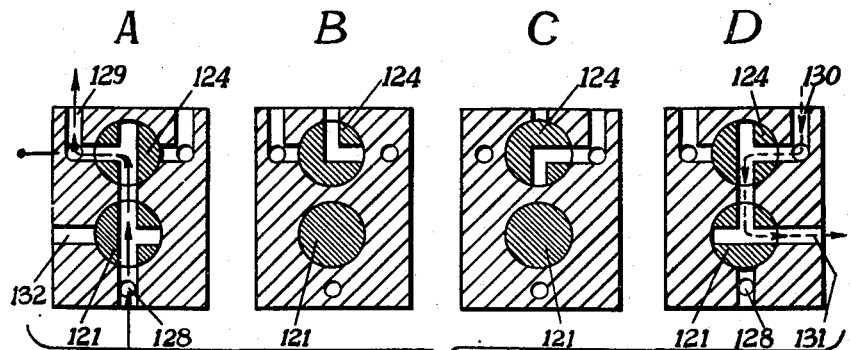
Figure 32 shows sections of the valve mechanism on the lines A, B, C, and D of Figure 31 in the direct impression position.
Figure 33:
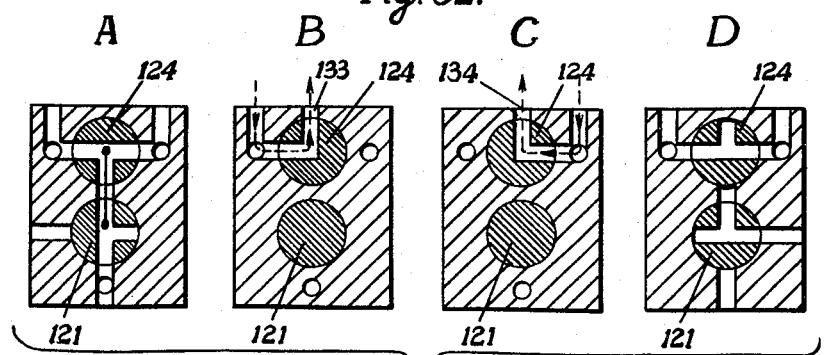
Figure 33 is a similar view with the valves in neutral position.
Figure 34:
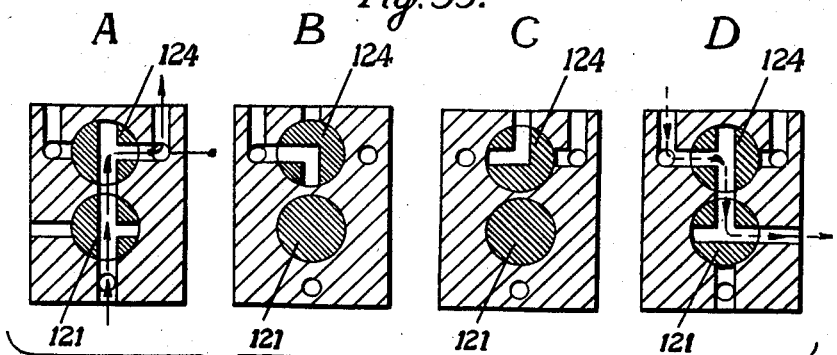
Figure 34 is a similar view with the valves in offset impression position.

As previously explained, the table 76 is movable in line direction along the glide bars 77 which support it, and can be clamped to these bars. The table structure is shown in Figures 23 to 25 and comprises a box casting 110 having bearings 111 for the glide bars. The casting 110 carries a pair of air cylinders 112, 113 by means of which the table is displaced. The pistons 114 of the air cylinders are connected to the tie bars 78 by rods 115 which are hollow and are provided with air pipe connections 116. Pressure air from any suitable source is supplied to the cylinders through a control valve shown generally at 117 in Figure 16. Referring to Figures 30 and 31 which show the control valve in detail, a cam G actuates a lever 118 which is connected by a link 119 and arm 120 to a rotary plug 121 in the valve body 122. The lever 118 is held against the cam by a spring 123. A second rotary plug 124 is arranged for hand operation. The connections 125 on the valve body are joined to the connections 116 on the tie bars by flexible pipes 126 which can be seen in Figure 16. The air supply to the valve is controlled by a tap 127. The different valve passages are shown in the diagrams, Figures 32, 33 and 34, which are sections on the planes A, B, C and D indicated in Figure 31. The diagrams of Figure 32 represent the direct impression position of the valve in which air is fed to the channel 128 at section A and passes directly through the two plugs 121, 124 to the outlet channel 129 and thence to the air cylinder 112 to drive the table in line direction. Sections B and C provide no through passage. At section D the exhaust from the reversing cylinder 113 enters the channel 130 and passes through both plugs 121, 124 to the outlet 131 to atmosphere. Reversal of the table is effected by rotating the plug 121 through 90° anticlockwise which opens the outlet port 132 at section A and allows the cylinder 112 to exhaust to atmosphere. At the same time the outlet port 131 at section D is closed and pressure air passes from passage 128 through the two plugs to passage 130 and thence to the reversing cylinder 113 in the table. When it is desired to move the table by hand, the air supply is cut off by the tap 127 and the plug 124 is turned by hand to the neutral position as shown by the sections in Figure 33. In this position air from cylinder 112 is exhausted to atmosphere through the outlet 133 at section B, and air from cylinder 113 is exhausted to atmosphere through the outlet 134 at section C. For the purpose of offset printing, to be described later, it is necessary that the automatic movements of the table should take place in the reverse directions. This condition is fulfilled by turning the plug 124 by hand to the offset position as shown in the diagrams of Figure 34, as a consequence of which the cam actuated movements of the plug 121 will impart the desired reversed movements to the table.

The means provided for clamping the table to its supporting glide bars 77 when an impression is made, and to the sizing bars 107 when the table is moved, comprise wedge mechanisms, one of which is shown in Figure 22. A main wedge 135 is disposed between two lateral wedges 136, the latter lying between a pair of blocks 137 attached to the table frame 110 and the bar to be clamped which in the present case is the sizing bar 107. A pair of bell crank levers 138 are pivotally mounted on the table at 139 for effecting inward displacement of the lateral wedges 136. Figure 22 shows the wedge mechanism in fully clamped position. A roller 135a on the main wedge 135 is adapted to be received in a slot in a suitable operating plate and the arrangement is such that upward movement of such plate displaces the main wedge 135 in the same direction and actuates the bell crank levers 138 causing the lateral wedges 136 to be driven inwards and thereby releasing the table from the bar 107. Downward movement of the operating plate forces the main wedge between the lateral wedges 136 and displaces them outwardly into clamping position. It will be noted that the opposed action of the lateral wedges obviates any possibility of creeping movement of the table during clamping.

A pair of wedge mechanisms as described above is provided for clamping the table to the glide bars, and these are indicated at 140 in Figures 23 and 24, the mechanisms being mounted on the outside of the table frame 110 and below the glide bars. A similar pair of wedges, indicated at 141, is provided for clamping the table to the sizing bars 107, these mechanisms being mounted on the table frame above the sizing bars and in inverted position in relation to the mechanisms 140. The sizing bar and glide bar wedges are actuated respectively by cams A and B which can be seen in Figures 13a, 18 and 21. These cams actuate separate levers 142 and 143, see Figure 15, to which are respectively connected a pair of similar intermediate levers 144 by means of pairs of double links 145, 146. To the upper ends of the levers 144 are connected separate rods 147 carrying springs 148 which abut against respective pivoted levers 149, the rods being slidable in said levers, and the upper ends of the levers engage within fork members 150 mounted on wedge cam bars 151 which are slidable longitudinally in the frame 79. These fork members allow for the the rising and falling motion of the frame 79. The wedge cam bars 151 are disposed one above the other and are each provided with three inclined slots 152, the slots in the upper bar being oppositely inclined to those in the lower bar. These slots are engaged by rollers 153 mounted on wedge bars 154 also disposed one above the other and movable vertically in the frame 79, being guided therein by means of rollers 155 mounted on the ends of the bars. Disposed at right angles to the wedge bars 154 are two pairs of operating plates 156, seen in Figures 23, 24 and 25, movable vertically in the tie bars 78 and formed with longitudinal slots 156a. The slots of the upper pair of operating plates are engaged by the rollers 135a of the main wedges 135 controlling the sizing bar wedge mechanisms 141. The upper wedge bar 154 is arranged to engage the upper edges of the upper pair of operating plates 156, the latter being slidable along the wedge bars during table movement. The lower wedge bar 154 is arranged to engage the lower edges of the lower pair of operating plates 156 which can similarly slide along the wedge bar. The arrangement is such that if the upper wedge cam bar 151 is displaced to the right as viewed in Figure 15, the associated wedge bar 154 will be forced downwardly and will similarly move the upper pair of operating plates 156 to actuate the wedge mechanisms 141 and thereby clamp the sizing bars 107 to the table. Similarly a displacement to the right of the lower wedge cam bar 151 will force the lower wedge bar 154 and the lower pair of operating plates 156 upwardly to actuate the lower wedge mechanisms 140 and thereby clamp the table to the glide bars 77. These movements to the right of the wedge cam bars can be effected by the similar levers 149. Unclamping of the wedge mechanisms is effected by reversal of the above movements under the action of springs 157 connected to the intermediate levers 144.

It will be understood that after the sizing bars 107 have been displaced into the table by the amount of table travel desired, as previously explained, the table is clamped to the sizing bars and unclamped from the glide bars and will then move under the action of air cylinder 112 over the pre-set distance which corresponds to the width of the previously made impression. The table is then clamped and the procedure is repeated. Upon completion of a line of impressions it is necessary to return the table to line commencing position, and this is effected by the reverse cylinder 113 under control of the valve previously described. The mode of actuation of this control valve will be described later.

Figure 13:
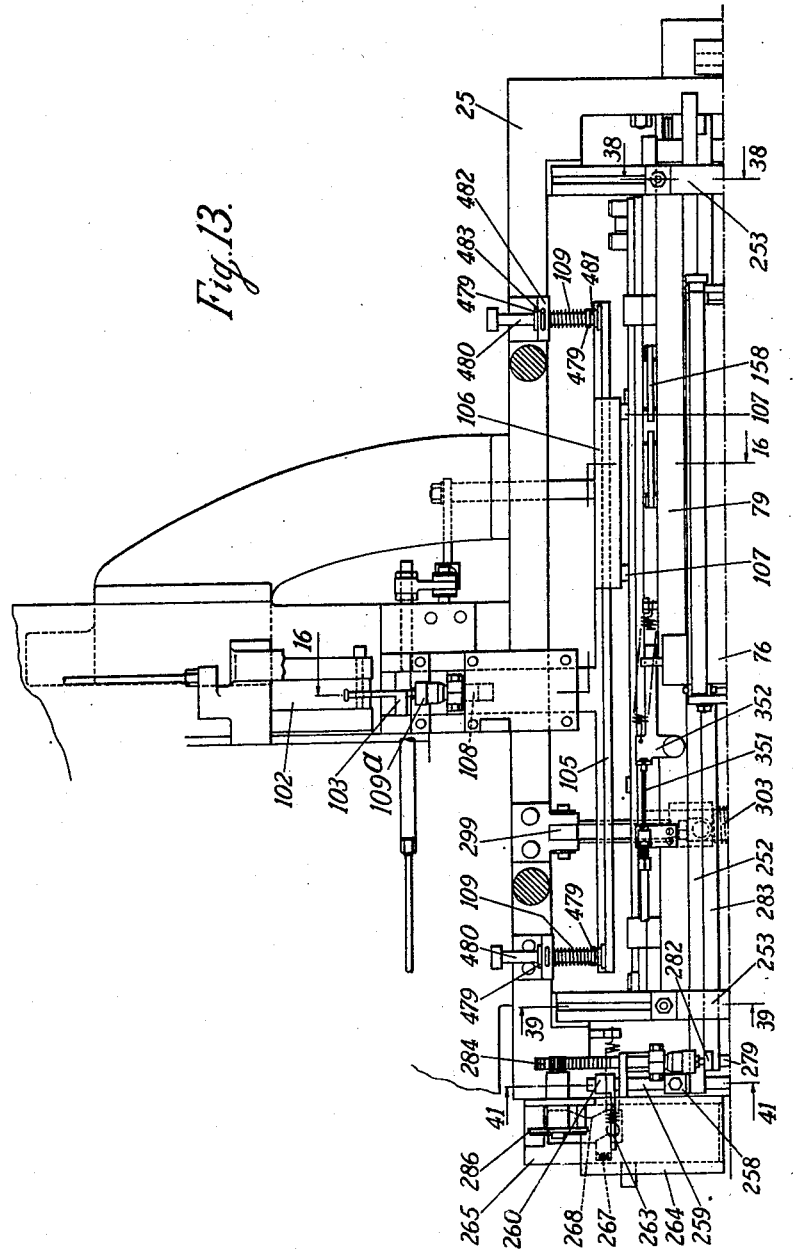
Figure 15:
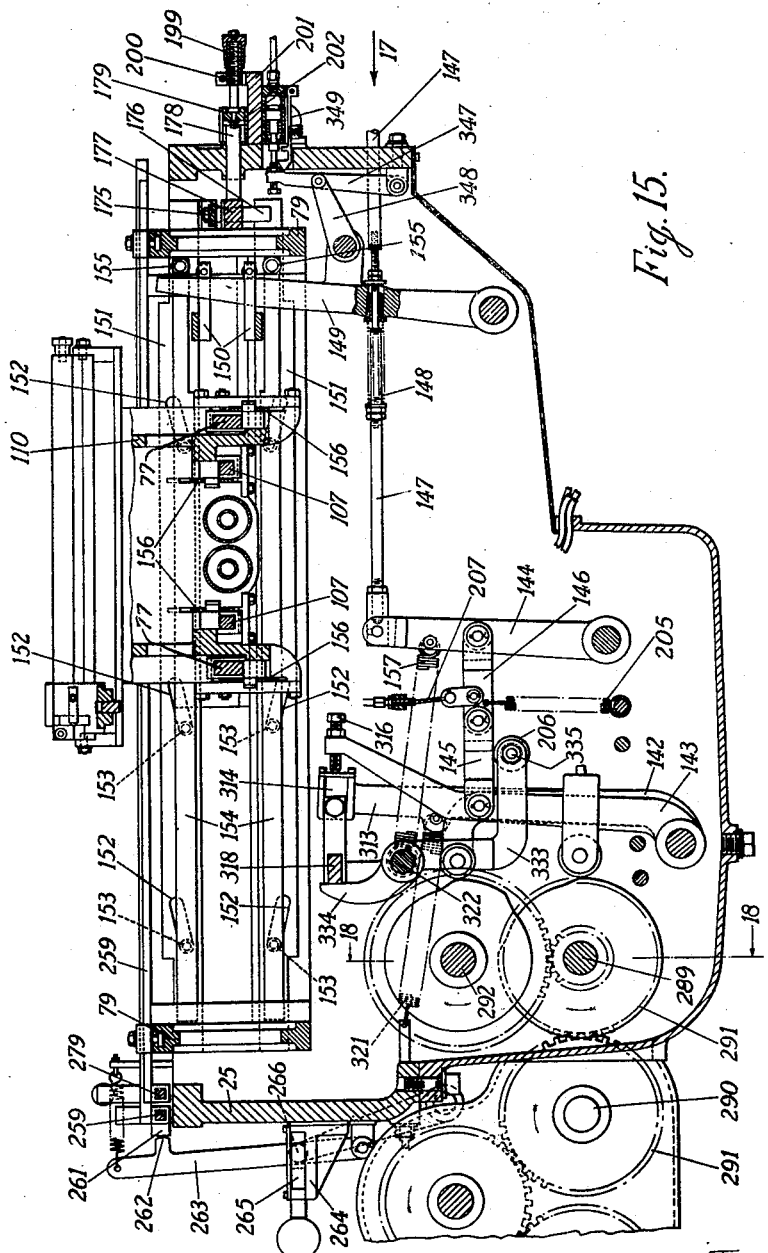

The mechanism for moving the table in the direction of the depth of the lines to afford the desired line spacing is similar to that employed for movement along the lines. This movement of the table takes place by the tie bars 78 (which interconnect the ends of the glide bars 77) sliding in the slots in the rising and falling frame 79 under the action of the cable attached weights 80 seen in Figure 14. The tie bars can be clamped to the frame by wedge mechanisms indicated at 158 in Figure 14 and also shown in Figures 13 and 13a. These wedge mechanisms are similar in construction to those employed for the glide bars and sizing bars and illustrated in Figure 22. They are operated by cam D which engages a pivoted lever 159 the upper end of which is connected by a double link 160, 161 to an intermediate pivoted lever 162 loaded by a spring 163. The upper end of lever 162 is connected to a rod 164 carrying a spring 165 which thrusts against a trunnion 166 of an arm 166a (see Figure 13a) attached to the shaft 167 journalled upon the underside of the frame 77. Arms 168 attached to the said shaft near the ends thereof are connected by links 169 to bell crank levers 170 pivoted on the said frame, the upper arms of said levers having slots 171 which engage the rollers 172 of the wedge mechanisms 158. By rotation of the cam D the wedge mechanisms will thus be operated to clamp and unclamp the tie bars in the frame 79. Referring to Figure 16, the tie bars 78 are formed with lateral projections 173 which extend outside the frame 79 and support the point bars 174 which determine the extent of movement of the tie bars when the latter are unclamped. These point bars are connected at one end by a point cross bar 175 as shown in Figures 13a and 15. Vertical pins 176 attached to the point cross bar are slidable in holes in a point transfer bar 177 which is slidable horizontally in the frame 79. Rods 178 attached to the bar 177 are slidable in holes in the main frame 25 and are adapted to coact with abutments 179, the bar 177 being urged against frame 79 by springs 180. Clamping of the point bars to the tie bars is effected by a pair of wedge mechanisms similar to those employed for the sizing bars. One of such mechanisms is indicated at 181 in Figures 14 and 26, and they are mounted on the tie bars and outside the rising and falling frame. The mechanism for operating these wedge mechanisms is shown in Figure 26. A cam E actuates a pivoted lever 182 connected to an intermediate pivoted lever 183 by means of a double link 184, 185. The upper end of the intermediate lever 183, which is loaded by a spring 186, is connected to a rod 187 carrying a spring 188 which thrusts against a bar 189 connecting a pair of similar pivoted levers 190. The upper ends of the levers 190 are located between rollers 191 on wedge cam bars 192 having inclined slots 193. These slots are engaged by rollers 194 on wedge bars 195, each of which is formed with a longitudinal slot 196 engaging the roller 197 of the main wedge of the wedge mechanisms 181. The wedge bars 195 have rollers 198 mounted at either end thereof to run vertically in the frame 79 and to prevent endwise movement of the bars. The arrangement is such that rotation of cam E will clamp the point bars to the tie bars and unclamp them as required.

Movement of the table in line depth direction when the tie bars are unclamped can be pre-set by the use of micrometers 199 mounted in brackets 200 on a shelf 201 secured to the main frame 25, as seen in Figures 13a and 15. The micrometers are connected to the abutments 179 which are secured to a leading base plate 202 which is adjustable laterally and can be clamped to the shelf 201 by means of bolts 203 which pass through slots in the leading base plate. Packing pieces or leading bars 204 are placed between the abutments 179 and the ends of the rods 178. Setting is effected by adjusting the micrometers 199, the plate 202 being free, until a gap equal to the desired line depth is opened between the ends of the rods 178 and the leading bars 204 of the abutments 179, the base plate 202 being then clamped down. It will be noted that the point cross bar 177 is normally held against the frame 79 by the springs 180. When the tie bars are unclamped they will move with the table in line depth direction until the rods 178 engage the leading bars on the abutments 179. The tie bars are then clamped and the point bars are unclamped so that the latter are returned to their previous position by the springs 180 acting through the transfer bar 176 and the point cross bar 175. The pins 176 allow for the rise and fall of the frame 79 as previously mentioned.

When preparing the machine for operation, or for other reasons, it is necessary that the table should be capable of being displaced by hand in either sense along its two directions of horizontal motion independently of the controlling cams previously described. This is provided for by means which enable the transmission between the respective cams and the appropriate wedge mechanisms to be interrupted when required so that the table can be unclamped. Referring to Figure 15, the pairs of double links 145, 146 forming the transmission between levers 142, 143 and the intermediate levers 144 are ordinarily held in rigid alignment by springs 205 connected to links 146 to hold the latter against rollers 206. Transmission cables 207 of a well-known kind are connected to links 146 so that by pulling on the cables the double links will be broken and the levers 144 will be pulled to the left by springs 157 and the glide bar and sizing bar wedge mechanisms will thereby be unclamped. Referring to Figure 14, the double links 160, 161 connecting levers 159 and 162 are held in rigid alignment against a stop plate 208 by a spring 209. A transmission cable 207 is connected to the link 161, so that by pulling on the cable the double link is broken and the lever 162 is returned by its spring 163 to unclamp the tie bar wedge mechanisms 158. Similarly, referring to Figure 26, the double link 184, 185 has a stop plate 210 and the link 185 has a spring 211 and can be broken by pulling on a cable 207, thereby unclamping the point bar wedge mechanisms 181. The four transmission cables can be operated independently by four handles 212 shown in Figure 14 and in detail in Figure 27. Each handle is attached to a sliding rod 213 to which is secured a stop 214 engageable with a block 215 slidable on the rod 213 and to which the ends of the cables 207 are attached. Each handle has a lug 216 and when the handle is pulled out to break the double link this lug can be located on a stop 217 by turning the handle through a right angle. To enable all the wedge mechanisms to be unclamped simultaneously, a fifth handle 218 is provided which is connected to a plate 219 which is engageable with the stops 214 on the four handles 212.

As previously described, the positioning of the sizing bars 107 which control the successive motions of the table in line direction is effected by the existing sizing rod 102 of the known composing machine acting through the set blade 103 (Figure 16). It is found desirable that the set blade should be clamped when not being displaced in order to prevent undesired movement of the sizing rod, and a suitable mechanism for this purpose is shown in Figures 35 and 36. The set blade 103 is slidable on its base in engagement with a lateral wall 220 and can be clamped against the latter by a screw 221. An arm 222 secured to the clamping screw is connected by a rod 223 to an arm 224 secured to a shaft 225. A second arm 226 secured to the said shaft has a fork head 227 to which is swivelled an apertured block 228 in which slides one end of a rod 229 connected to the upper end of a pivoted lever 230. A spring 231 on the rod 229 bears against the swivel block 228 and its other end abuts a stop 232 on the rod. The lever 230 is actuated by a cam L and is loaded by a spring 233, the arrangement being such that rotation of the cam will clamp and unclamp the set blade at the required times.

The end positions of the table in its travel in the direction of the length of the lines are determined by a zero bar 244 (see Figure 13a) extending across the rising and falling frame at the starting position, and by reversal of the table after the last line has been impressed. The zero bar 244 extends between two clamps 245 as shown in Figure 37. The top surfaces of the end walls of the rising and falling frame 79 are formed with a reversed T slot 246 and also have transverse serrations 247 the slots of which are accurately spaced at two pica intervals, equal to .332 inch. The clamps 245 are locked to the frame 79 by bolts 248 and are located by tongues 249 on the clamps which enter the transverse slots of the serrations 247. The zero bar 244 is secured to the clamp 245 by a bolt 250 engaging eccentrically in a disc 251 seated in the clamp. Thus by adjusting the disc 251 the zero bar can be set to quarter pica distances.

Extending across the rising and falling frame adjacent the end position of table travel in line length direction is a set stop bar 252 as seen in Figure 13, which is held between clamps 253 secured to the ends of the frame. As shown in Figure 38, the clamps 253 are secured to the frame by bolts 254 engaged in the T slots 246, and they are located on the frame by lugs 255 in the same way as the previously described clamps for the zero bar. The set stop bar 252 is slidable laterally in the clamps 253 against springs 256 and when the said bar is engaged by a buffer 257 on the moving table, it engages and moves one of a pair of adjustable stops 258 attached to an operating bar 259 disposed at the side of the main frame 25 and at right angles to the set stop bar 252. A lug 260 is secured to the end of the operating bar 259 and has a projection 261 on one side thereof (see Figure 15) against which bears a projection 262 on a stop lever 263. A bracket 264 on the main frame 25 carries a stop slide 265 which holds the existing stop rod 266 of the known composing machine in operative position. The stop slide 265 is retained in the position shown in Figure 15 by a latch 267 bearing against the stop lever 263. The arrangement is such that when the lug 260 is moved by the operating bar 259, the stop lever 263 moves away from the latch 267 and allows the slide 265 to move under the force of the stop rod 266 of the known composing machine and shifts the driving belt from the fast pulley to interrupt the drive. To reset the mechanism, the slide 265 is pushed until the latch 267 passes the lever 263 and can thus retain slide 265 by bearing against the stop lever 263. The slide is slotted and the slot is formed on one side with a projection 268 as seen in Figure 13 and this projection moves the stop lever 263 out of the path of the lug 261 and allows the operating bar to return to its initial position.

The two projections 261 and 262 will then meet end on. By the means described the machine is stopped if the table should travel beyond the predetermined end position in the direction of the length of the lines.

Figure 40:
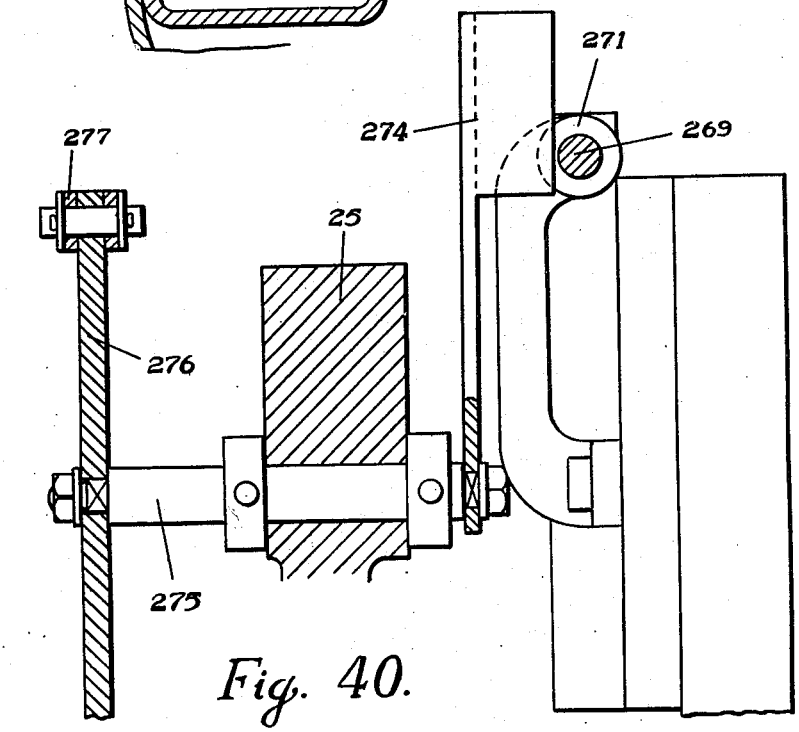

Means is provided for controlling the travel of the table in the direction of line depth in accordance with the depth of page required. The zero position of the table for this direction of motion is determined by the tie bars 78 engaging the end wall of the rising and falling frame 79. For controlling the other limiting end position corresponding to the bottom of the page, a spring loaded rod 269 is mounted in brackets 270 carried on the outer wall of the rising and falling frame 79 as shown in Figures 13a, 14 and 40. Secured to the rod are two collars 271, 272 and the collar 271 is arranged to engage a bracket 273 secured to the tie bar 78. The second collar 272 is arranged to engage an operating arm 274 on a shaft 275 also having secured to it a lever 276 which is connected by a rod 277 to a bell crank lever 278 which is connected to the operating bar 259, see Figure 39. The collar 271 is set to correspond to the required page depth and when struck by the bracket 273 the movement is transferred through the above described linkage to the operating bar 259 and thence to the stop lever 263 as previously explained. If it is desired to stop the machine by hand, this can readily be done by manually operating either the lever 276 (see Figure 1) or the stop lever 263.

Where there occurs a blank space of appreciable extent in a line of impressions, or typographical surfaces consisting of a repetition of the same character, e. g. em rules constituting a rule line across a page or fullpoints or leaders to form a dotted rule or perforating means, the keyboard operator, who prepares the perforated strip which controls the machine in the known manner, causes certain perforations to be made in the strip which result in the machine performing the last operation continuously until it is interrupted. The means for effecting such required interruption at the end of the blank space comprise an operating bar 279 as shown in Figures 13, 13a and 41 which is arranged parallel to the previously described operating bar 259 and has adjustably attached thereto a pair of brackets 280 carrying micrometers 281. One of these micrometers is arranged to engage an upstanding lug 282 on a cut-out bar 283 which lies adjacent the stop bar 252 in the clamps 253 as shown in Figure 38. The operating bar 279 is formed at one end with teeth 284 meshing with a pinion 285 on the shaft of a cam 286 arranged to actuate an air valve 288 through a lever 287. The arrangement is such that the micrometer bracket 280 can be adjusted to any desired position on the operating bar 279 and the cut-out bar 283 can be advanced by any desired distance, e. g. 2 ems, by opening the micrometer. When the table reaches the predetermined position it engages the cut-out bar 283 and thereby displaces the operating bar 279 and actuates the valve 288 which causes air to flow to the known pneumatically actuated mechanism on the paper tower to operate the cut-out mechanism associated therewith.

It will be convenient at this time to consider the arrangement and driving of the cam shafts by which the various movements of the machine are effected. Referring to Figure 18, the main cam shaft 289 is driven from the existing cam shaft 290 of the known composing machine by gears 291 having a 1:1 ratio as seen in Figure 15. This main shaft 289 carries cams J, F, B, A, O, H, L and F. A secondary cam shaft 292 is situated above the main cam shaft and is driven therefrom by gearing having a 1:3 ratio. A gear wheel 293 freely journalled on the secondary shaft 292 meshes with a wider gear 294 secured to the main shaft 289 to give the above reduction. Dogs 295 on the gear wheel 293 can be brought into engagement with similar dogs on a clutch member 296 secured to shaft 292 by sliding the gear wheel along the shaft. The means for sliding this gear wheel are described later. The secondary shaft 292 carries cams G, M, D, C and E.

Considering now the operations necessary for effecting line justification, the existing trip rod 297 of the known composing mechanism, seen in the right-hand wall of the main frame 25 in Figure 16, can engage a projection 298 on the pivoted justification lever 299 which is connected by a link 300 to a vertically disposed justification frame 301 slidable on a shaft 302 as seen in Figure 14. The frame is returned, after actuation by lever 299, by a spring 303 seen in Figure 13. The frame 301 carries a fork 304 (Figures 14 and 18) which can be engaged with the gear wheel 293 to shift the latter into engagement with the clutch member 296. The latter is ordinarily held stationary by a pivoted stop arm 305 which engages a recess in the clutch as shown in Figures 19 and 20. When the gear wheel 293 is shifted towards the clutch member, its tapered hub 306 raises the stop arm and releases the clutch before the dogs 295 come into meshing engagement. The gear wheel 293 is returned by a fixed roller 307 shown in Figure 20 which engages a cam formation 308 on the face of the gear wheel 293. The justification frame 301 has two depending arms 309 formed at their lower ends with forks 310 (Figure 14) which engage the annular groove 311 in uncoupling arms 312 attached to the tapered bolt 89 shown in Figure 28. It will be understood that the trip rod 297 previously referred to has three positions which can conveniently be designated normal, half and full positions, the half position being for single justification and the full position for double justification.

The means used during the single justification operation are shown in Figures 13a, 15 and 16. Cam O actuates a lever 313 the upper end of which contains a rack 314 formed with recesses 315 located opposite to screws 316 secured to the upper ends of the pivoted levers 142 and 143. The rack 314 is movable in the direction of its length and this movement is controlled by lugs 317 which project laterally from the upper member 318 of the justification frame 301. The lever 313 is continuously rocked by cam O and the screws 316 will enter the recesses 315 in the rack, thereby allowing the levers 142 and 143 freedom of movement. When the frame 301 is displaced into the position for single justification as previously described, projections 319 of the rack are brought into line with the screws 316 and when the lever 313 is moved towards the said screws the aforesaid rack projections will engage them and actuate the levers 142 and 147 so that the wedge mechanisms for the glide bars and sizing bars are clamped. The trip rod 297 will return before it is required to unclamp the wedge mechanisms. The rack is held in position in such circumstances by subsidiary lugs 320 on the rack projections which engage the sides of the screws 316 and the justification frame is thereby prevented from returning under the action of its spring until cam O has rotated to permit return of the lever 313 by its spring 321.

During a double justification operation, there is provided a shaft 322 (Figure 13) carrying a bell crank lever 333 having an upstanding tail 334 and carrying at its lower end a spindle 335 on which is mounted the roller 206 which engages the link 145 and holds the links 145, 146 in rigid alignment against the pull of spring 205. The bell crank lever 333 is actuated by cam C. When the justification frame is moved to the position for double justification, the clutch 296 (Figure 18) is engaged and the secondary cam shaft 292 will thereby be caused to make a single revolution only. It will be understood that the main cam shaft 289 is running and will make three revolutions while the secondary shaft revolves once. In this position of the justification frame a recess 336 in the upper frame member 245 will be opposite the tail 334 of bell crank lever 333. Rotation of cam C will allow lever 333 to swing and thereby remove the roller 206 from beneath the link 145, so that the double link 145, 146 is broken and the intermediate levers 144 can move under their springs 157 to unclamp the wedge mechanisms of the glide bars and sizing bars. The position of the tail 334 of bell crank lever 333 in the recess 336 of the justification frame member 245 prevents the return of the said frame under the action of its spring until cam C returns the lever 333 to its previous position and thus removes the tail 334 from the recess. The rotation of the secondary cam shaft 292 carrying the cams C, D, E, G and M causes the wedge mechanisms of the tie bars and point bars to be unclamped in succession, and also actuates the air control valve of the table operating cylinders to reverse the table and bring it back to a position for starting the next line. In addition, the tapered bolt 89 controlling the table rise and fall mechanism is withdrawn so that this mechanism is rendered inoperative. A further function performed at this time is the operation of the perforators, which will be described hereinafter.

It will be seen that by the mechanism above described the trip rod of the existing composing machine controls, through the medium of the justification frame, the operations of single and double justification. During the one revolution of the cam shaft 289 for single justification, all the wedge mechanisms are clamped and the operation of the table rise and fall mechanism is interrupted. During the three revolutions of the said cam shaft for double justification, the wedge mechanisms are unclamped in succession, the table rise and fall being interrupted, and the table operating air cylinders reverses so that the table is returned to starting position for a new line.

Mention has previously been made of the packing pieces or leading bars 204 (see Figure 13a) which are placed between the ends of the rods 178 and the abutments 179 which determine successive movements of the table in the direction of the depth of the lines. In order to enable these line depth movements to be varied as desired, the leading bars have a portion of their length reduced in thickness as shown at 337 and are movable across the abutments by air pistons against the action of springs. Referring to Figure 17, the leading bars 204 are connected to pistons 338 slidable in cylinders 339 mounted beneath the leading shelf 201, and the pistons have return springs 340. Pressure air from a suitable source is admitted by a pipe 341 to a valve box 342 and has access to a port 343 (Figure 13a) which extends transversely across a pair of pistons 344 and 345 and has two outlets 346 connected to the two leading cylinders 339. The leading pistons are controlled by making use of the 10 and 31 perforations on the existing composing machine in combination, the 10 vent being connected to act upon the piston 344 and the 31 vent being connected to act upon piston 345. These pistons have annular grooves as shown and air will not be admitted to the leading cylinders unless both pistons are operated together. Thus the 10 and 31 perforations on the existing composing machine can be used separately as may be desired, but will only actuate the leading mechanism when used in combination as described above. When the leading pistons 338 are operated, the leading bars 204 are displaced lengthwise so as to bring their reduced portions 337 opposite the rods 178 so that the table will move in line depth direction over an increased distance, the increase being represented by the difference between the larger and smaller thicknesses of the leading bars. Should the pistons 344, 345 fail to return for any reason after operation, this is effected by a lever 347 as shown in Figure 15, which lever is connected by a link 348 to the lever 149 actuating the wedge mechanisms for the glide bars and sizing bars. The pistons are held open by a latch 349 and this is removed from latching position by the lever 347.

Figure 42:
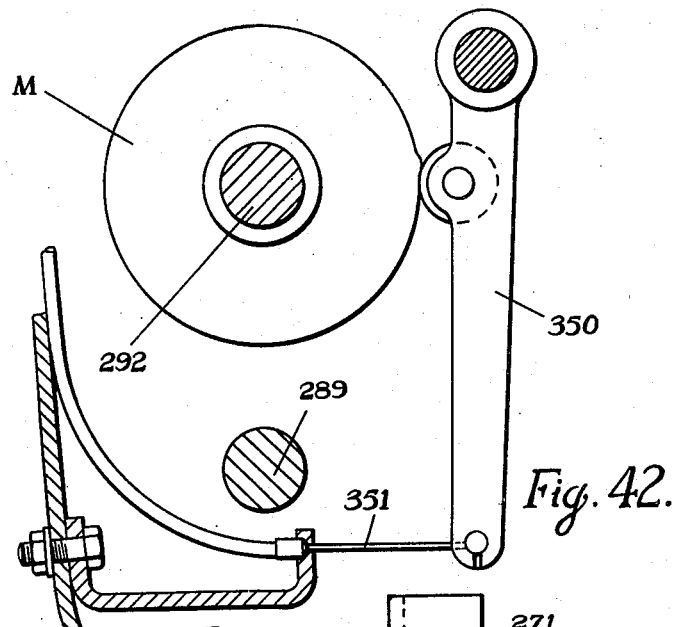
Figure 42 is an elevation of the cam and lever arrangement for operating the perforators.

As previously mentioned in describing the double justification operation, a perforating operation is also performed. The purpose of this is to punch a hole at the beginning and end of each line of impressions to facilitate the subsequent correction of any errors that may arise or the replacement of lines by others. For this purpose cam M on the secondary cam shaft 292 actuates a pivoted lever 350 to which is connected a transmission cable 351, as shown in Figure 42. The other end of the cable is connected to a bell crank lever 352 pivoted on the rising and falling frame. The other end of the bell crank lever engages in an aperture in a perforator bar 353 resting on cam blocks 354 on the rising and falling frame 79, see Figure 43. Movement of the perforator bar to the right as viewed in the above figure causes its cam projections 355 to ride up the cam blocks 354. Punches 356 rest on the perforator bar and are located in housings 357 slidably mounted in parallel clamp bars 358 secured to the table frame. The punches are held stationary in the line depth direction by anvil rails 359 secured to the cam blocks 354. The blanks formed by the operation of the punches are cleared from the punch hole by a wiper arm 360 attached to a spindle 361 formed with a quick thread 362 engaging with a pin 363 secured to the punch 356. The blanks are swept by the wiper arm into a removable container 364. These perforations are always in a predetermined position in the margin relative to the depth of character impressed.

Considering now the construction of the upper part of the table as shown in Figures 43, 44 and 45, the main frame casting has secured to its upper edge an interplate 365. A pair of runners 366 are secured to the interplate and each runner is formed with a slot 367 lengthwise therein. Through these slots 367 pass studs 368 which are fixed in both ends of the clamp rails 358 which can be locked in any position along the runners 366 according to the line width to be impressed. A plate 369 rests in recesses in the upper surfaces of the clamp rails 358 and forms a support for the material 370 which receives the impression. Clamping springs 371 are hinged at one end 372 to the clamp rails and can be held in material clamping position by means of thumb screws 373 which engage slots in their turned down ends 374. The anvil rails 359 carry an anvil 375 secured thereto, which is located directly below the point at which impression takes place and affords a firm basis for making the impression. It will be clear that the anvil remains stationary and does not move with the table.

For the production of an ink impression directly upon paper or like material, it is necessary to provide means for inking the face of the selected and displaced die and for cleaning the previously inked face after the impression has been made. A convenient arrangement for this purpose is shown in Figures 46, 47, 48, 49 and 50 and is arranged at one end of the main frame structure 25 as illustrated generally at 366 in Figures 1 and 2. An inking roller 367 and a cleaning roller 368 are mounted at the end of a swinging arm 369. The inking and cleaning arrangement is carried by a base 370 which is bolted to the main frame 25 and can be removed therefrom as a unit if desired. The inking and cleaning operations are effected by cam J on the main cam shaft 289, the cam actuating a lever 371 connected at its upper end to a longitudinally slidable rack bar 372 on which are three toothed racks 373, 374 and 375, the lever 371 being returned by a spring 376. Ink is fed from a reservoir 377 through a hole in a plate 378 to a roller 379 mounted in a carriage 380. Movement of the carriage to the right in Figure 46 transfers ink to a revolving plate 381. Also mounted on the carriage 380 are five contacting rollers 382 the first of which passes across the revolving plate 381, thereby transferring the ink from one roller to the next and causing the ink to be spread evenly along the length of the said rollers. Movement of the carriage to the right causes the final roller 382 to transfer ink to an inking plate 383. The carriage 380 is operated by the rack 384 meshing with a pinion 385 which in turn meshes with rack 373 on the rack bar 372. The revolving plate 381 is given a step-by-step motion by an adjustable stop 386 on the carriage striking an arm 387 carrying a pawl 388 which engages a ratchet wheel 389 on the spindle of the revolving plate.

For cleaning the die face there is provided a pad 390, situated alongside the inking pad 383, made of felt or other suitable material which is fed with a suitable ink solvent from a reservoir 391. Mounted at the opposite end of the base plate 370 is a cleaning plate 392 driven by the rack 375 on rack bar 372 through the medium of a ratchet and pawl arrangement 393. The cleaning plate 392 has an upper surface 394, see Figure 49, of felt or similar material across which the previously mentioned cleaning roller 368 is caused to pass by swinging of the arm 369. A wiper plate 395 is arranged to have rubbing contact with the cleaning plate for removing dirt and ink therefrom, and can be cleaned when required by the operator. The wiper plate is rotated by gearing shown generally at 396. The inking and cleaning rollers 367, 368 are freely rotatable on the arm 369 which is slidable in a head 397. The inner end of the arm 369 carries a roller 398 engaging in the cam slot 399. The head 397 is keyed to a vertical spindle 400. Also keyed to the spindle 400 is a yoke 401 carrying a pair of rollers 402 running on a rising and falling cam 403 secured in the base 404 secured to the base plate 370. Also keyed to the spindle 400 and slidable thereon is a gear 405 meshing with the rack 374 of the rack bar 372. The cam slot 399 is formed in a cam plate 406 which slides vertically together with the head 397 in the base 404 and is prevented from rotating by a projecting lug 407 engaged in a recess in the base 404. The purpose of the rising and falling cam 403 is to raise the arm 369 towards the end of its swing with the object of moving it out of the path of the rising table. The arm is shown in its rest position in the figures referred to above. The arrangement is such that by the rotation of cam J the arm 369 is caused to swing in a clockwise direction so that the rollers 367, 368 pass across the inking plate 383 and cleaning pad 390 respectively and thereby pick up ink and solvent. The roller 398 at the inner end of arm 369 travels in the outer track of the cam plate 406. After the inking roller 367 has passed under the ejected die face to ink it, the cam slot 399 causes the arm to be forced outwards so that the cleaning roller 368 occupies the position previously occupied by the inking roller. In this position the cleaning roller passes across the cleaning plate 392 and ends its swing in this position, any ink or dirt on this roller being deposited on the plate surface 394. The further rotation of cam J then causes a return swing of the arm 369 and the roller 398 then runs in the inner cam slot 399. As the cleaning roller passes off the cleaning plate 392 the latter is revolved to present a clean surface to the roller. The cleaning roller is then swung underneath the die face and removes any ink remaining thereon and the cam 399 subsequently causes the arm 369 to be withdrawn so that the inking and cleaning rollers are brought back to their initial positions as shown in Figure 47. During the first swing of the arm 369 the carriage 380 is advanced to ink the plate 383 and is withdrawn on the return swing of the arm.

As an alternative to the inking arrangement previously described there may be provided a ribbon through which the impression is made by the vertical engagement of the paper or other material on the table and the ejected die face. The ribbon employed may be similar to typewriter ribbon and can be impregnated with ordinary or lithographic ink, or a ribbon composed of foil coated with prepared pigment or prepared gold leaf or the like may be employed. A convenient arrangement for this purpose is shown in Figures 51 and 52. When using the ribbon arrangement, the previously described inking mechanism is removed as a unit on its base plate 370.

The ribbon arrangement consists of a ribbon feed unit 408 and a ribbon take-off unit 409 which are bolted to the bridge plate 27 of the machine. A full spool 410 is placed on the spindle 411 and is retained by a wing nut 412 which can be adjusted to give the desired pressure through an intermediate spring and thereby avoid slackness in the ribbon. The base plate 413 of the feed unit carries a spring loaded pivoted arm 414 which keeps the ribbon 415 taut. The ribbon passes underneath the previously described die clamping assembly 31 and over a roller 416, thence through a ribbon clamp 417 and between feed rollers 418 (see also Figures 53 and 54) to the take-off spool 419. Since expensive ribbon foils may be employed, the mechanism is arranged so that the ribbon is fed forwardly after each impression through a distance corresponding to the width of the impressed character. A silent feed pawl 420 is connected through link 421, lever 422, link 423 and lever 424 to the previously described set blade 103 of the machine. The silent feed lever 425 is engaged with the feed roller shaft 426 through a friction pad 427. The feed rollers are pressed together by a spring 428. The take-off spool 419 is driven through a spring belt 429 from a pulley 430 mounted on the silent feed lever 425.

Means is also provided for preventing feeding of the ribbon after a space in the line of impressions. For this purpose the ribbon is clamped between a block 431 as seen in Figure 55 and a movable cut-out clamp 432. The operation of the cut-out clamp is effected by mechanism associated with the die clamping arrangement illustrated in Figures 8, 10 and 11. Connected to the control arm 45 through the medium of the spring 433 and bell crank lever 434 is a detector rod 435 which passes through an aperture in the die clamping jaw 61. When the control arm 45 is approaching the lowest point of its downward movement, the detector rod 435 is pushed inwardly towards the die 12. If a character bearing die has been projected from the die case, the detector rod will be arrested when it engages the projected die. When a space is to be left in the line of impressions, a so-called space die is employed and such die is not projected from the die case. Thus when a space is required there is no die in the path of the detector rod 435 and the latter can complete the full length of its stroke. The consequent additional movement of the bell crank lever 434 is transferred through its shaft 436 to a lever 437 to a rod 438 (Figures 54 and 55). A collar 439 on the rod acting through a spring 440 moves the sliding wedge 441 to actuate the block 431 and thereby clamp the ribbon so that no ribbon feed takes place. The rod 438 is held in clamp operating position by a pivoted catch 442 which engages a collar 443 on the rod. This catch can be released by a transmission cable 444 connected by a lever arrangement 445 (see Figure 8) to the operating rod 147 seen in Figure 15. The arrangement is therefore such that the latch will be disengaged and the ribbon unclamped ready for the succeeding impression. The means previously described for determining successive movements of the table in the direction of line depth include the leading bars 204 shown in Figure 13a in conjunction with the micrometers 199 which enable the depth travel to be varied by hand manipulation of the micrometers. As an alternative to the manual adjustment of micrometers, the arrangement shown in Figures 56, 57 and 58 may be employed. A bracket 446 is secured to the leading shelf 201 on the main frame 25 and carries inwardly extending posts 447. A vertical slide 448 has bosses 449 sliding on the posts and is urged inwardly by springs 450. A holder 451 is movable vertically in the slide 448 and carries a series of point gauges 452 of different thicknesses which can be interposed between the ends of the rods 178 on the point transfer bar 177 and the leading bar 204. The lower end of the holder 451 is provided with a series of holes 453 which can be located over a fixed pin 454 to bring the selected point gauge into position to be engaged by the rod 178. The springs 450 maintain the point gauges in engagement with the ends of the point transfer bar rods 178. Thus by merely displacing the holder 451 into the required position, the table movements in line depth direction can be varied in a convenient and easy manner without the necessity of adjustment involving manipulation of the micrometers. It will be noted that if desired, adjustments of the variable point gauges may be used in conjunction with micrometer controlled adjustments.

For some kinds of impression, for example when gold blocking leather, cloth, or other material as for book covers, lettering pieces, inserts and the like, it is desirable to heat the die. Thus when pigment or gold leaf is employed, this is attached to the ribbon base medium by adhesive such as synthetic starch and this requires to be warmed to cause the pigment or leaf to adhere to the receiving surface when the impression is made. For such conditions a die heating arrangement as shown in Figures 59 and 60 is employed. A frame 455 is provided carrying a small gas ring 456 having a supply pipe 457 and a connection 458 for a flexible gas supply tube. Air is supplied by a passage 459 in a block 460 and can be adjusted by a screw 461. The gas ring is enclosed by a pair of plates 462 of heat resisting material formed with apertures 463 shaped to receive and closely surround the ejected die 10. In this way the heat is localised and damage to the medium upon which the impression is made is prevented. When using this arrangement, the die clamping assembly shown generally at 31 in Figure 8 is removed from the bridge plate 27 and is replaced by the frame 455 carrying the gas ring. The ribbon of gold or other foil is suitably guided and fed beneath the die by using the ribbon feed means previously described.

In some circumstances it is desirable to heat the medium which receives the impression, as for example when the medium is of a kind which has sufficient plasticity for retaining an impression only when heated. A suitable arrangement for this purpose is shown in Figure 61. The interplate 365 of the table (see Figure 43) has secured to it a box-shaped structure 464 the top 465 of which affords the required support for the impression receiving material. Any suitable heating device, using steam, gas, or electrical heating, can be provided within the structure 464. As shown in Figure 61, electrical heating elements 466 are clamped to the underside of the top 465 by means of plates 467, and a thermostat indicated diagrammatically at 468 is provided for controlling the temperature.

In the foregoing description of a convenient mode of carrying the invention into effect, it has been assumed that the machine is to be used for producing lines of impressions on the receiving material, for example a printed sheet, which are intended to be read from left to right in the ordinary manner. For certain purposes however, for example in connection with offset printing or some foreign languages, it is desired to produce reversed impressions in reversed order along the lines. This can be achieved with the machine described by employing dies with their character faces reversed in line direction and by causing the table movements in the direction of the length of the lines to take place in the reverse sense. For this purpose the machine described requires adjustment in certain respects and the manner in which this is accomplished will now be described. The successive table movements are effected under the action of the air cylinder 113 and the return is effected by the cylinder 112, see Figures 23, 24 and 25. For this purpose the control valve is moved to the position shown in Figure 34. Referring to Figure 16, the set bar 106 (clamped to the table through the medium of the sizing bars 107) will move up to the stop 108, the set bar and transfer bar 104 being pressed by the spring 109 up to the positioned set blade 103. For controlling the reversed motion it is necessary that the sizing bar mechanisms should be actuated by cam B and the glide bar wedge mechanisms by cam A. This is effected by the change-over mechanism shown in Figure 21. The lever 142 (Figure 15) is formed with an arm 469 carrying a second roller 470 and the cams A and B are carried on a bush 471 slidably keyed to the shaft 289. A fork 472 located between the cams A and B is attached to a slidable rod 473 having an operating handle 474. A tongue 475 can be located in either of a pair of slots 476, 477 in a fixed bracket 478. By moving the handle so that the tongue 475 occupies the slot 477, the cam A is moved opposite the lever 143 and the cam B is moved to actuate lever 142 through the roller 470. Also the zero bar 244 and the set stop bar 283 require to be removed to the opposite end of the rising and falling frame and reclamped in reversed positions, this being readily effected by releasing the clamps 245 and 253 (Figures 37 and 38) from the T slot 246. It is also necessary to reverse the action of the springs 109 on the set bar 106. Referring to Figures 13 and 16, each of these springs bears on a pair of bushes 479 which are slidable on the rod 480, and each bush is grooved as shown at 481. The bushes can be held in brackets 482 by means of U-shaped pins 483. To effect the required reversal, the pins are removed and both bushes passed through the brackets, the pins being re-inserted to hold the second bush so that the springs act in the opposite direction. If the ribbon feed arrangement previously described is being used, this requires to be changed over so that it is operated by cam B. Referring to Figure 8, this is readily accomplished by removing the pin 484 from the rod 147 actuated by cam A and inserting it into the similar rod actuated by cam B.

It will be understood that the form of die to be used in conjunction with the machine described above may be widely varied, and a modified construction in which a conventional type is mounted in a holder is shown in Figure 63 which illustrates the lower part only of the die. The reduced shank portion 11 and recessed portion 17 are similar to the previously described construction, but the lower portion 10 is hollowed to provide a pair of walls 485 and 486 lying at right angles. A spring plate 487 is secured opposite the wall 486 and is formed with a projection 488, or two or more such projections may be provided. A groove 489 formed in the part 10 accommodates a spring rod 490 which is secured by a screw 491. The type 492 is held against the wall 485 by the spring rod 492, and is also held against the wall 486 by the spring plate 487 and an interposed packing piece 493. The arrangement is such that types of different widths can be accommodated by using different packing pieces and the type can readily be exchanged.

In some circumstances it is desirable to vary the amount of die ejection for certain dies, and an arrangement which enables the amount of ejection to be varied according to the position of the die case is shown in Figure 63. In the previously described arrangement as shown in Figure 8, the downward movement of the plunger 20 is determined by a stationary striking surface (58).

In the modified arrangement, this striking surface is constituted by a plate 494 which rests on a horizontally slidable wedge member 495. A connecting member 496 is secured by a nut 497 to the wedge member and at its lower end is secured to the die case frame 40. Movement of the die case to the left as shown in the figure will displace the wedge member 495 in the same direction and thus raise the level of the striking plate 494, thereby reducing the distance by which the die is ejected. When such variation is not required, the wedge member can readily be rendered inoperative by removing the nut 497 and displacing the wedge member until a hole 498 registers with a hole 499 in the fixed part 500, a pin being dropped into the two holes to retain the wedge member in this position. It will be seen that when the movable wedge 495 is displaced with the die case, certain rows of dies will be ejected further than others, and hence the amount of ejection may be suited to certain dies or groups of dies, in accordance with their character. This may be of particular importance when impressing flong or similar materials, but may also be useful for other purposes.

Figure 64:
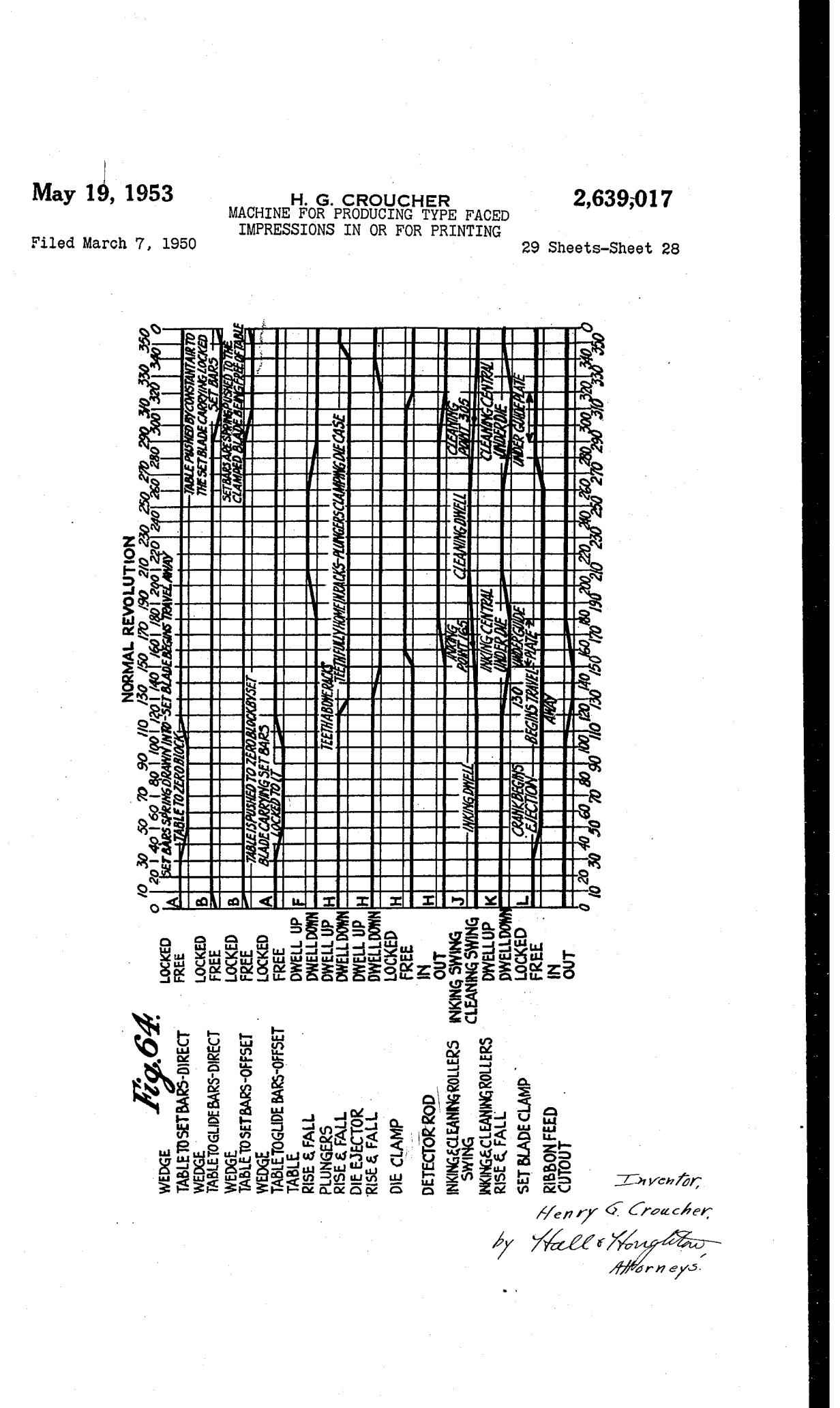

It will be appreciated that the cams which control the motions of the various parts of the machine are suitably formed and co-ordinated so that the operations are performed in the desired sequence. The timing graphs of Figures 64 and 65 show the operations of the various cams during a normal single revolution of the main cam shaft for effecting an impression or during single justification, and during the three revolutions of the main cam shaft for double justification as previously described. The set bars referred to in these diagrams are the sizing bars referred to in the previous description.

In the operation of the machine, the existing part of the composing machine previously referred to, runs in the ordinary manner and is controlled in the known way by a perforated strip controlling pneumatic mechanisms. Two perforations corresponding to single and double justifications in the paper strip set wedges in the known part of the machine which determine the width of the space between words. The perforations corresponding to characters cause corresponding pins in the pin blocks 2 and 3 (Figure 2) to be raised and the tong mechanisms 4 and 5 are moved to clamp the pins as is well known. The tong mechanisms position the die case to bring the required die in position for impression. The selected die is then projected and clamped. The inking roller next passes over the die face and the table is raised to effect the impression and then lowered, the cleaning roller then passing over the die face. The die is then released and the table is moved in line direction by a distance equal to the width of the previous impression and these operations are repeated until the end of the line is reached, when further single and double justification perforations in the paper strip cause the setting of the spacing wedge for the next line and the setting of the table for the next line. The sequence of movements for an ordinary or direct printing operation is as follows:

1. Table set at zero bar 244 and all wedge mechanisms clamped, the transfer bar 104 being against its stop and the air control valve being in position for direct printing.
2. The control arm 45 commences to move downwardly and the plungers 57 clamp the die case.
3. The projector 20 displaces the die.
4. The die is clamped.
5. The detector rod 435 moves up to the die.
6. The inking roller passes under the die.
7. The inking roller arm swings clear of the table.
8. The table rises and the impression is made.
9. The table descends, the inking roller arm commences to return and the set blade 103 is clamped.
10. The glide bars are unclamped and the table moves carrying the clamped sizing bars; the detector rod is withdrawn.
11. The cleaning roller passes over the die face.
12. The die is unclamped.
13. The die returns to the die case.
14. The die case is unclamped.
15. The glide bars are clamped to the table.
16. The set blade is unclamped.
17. The sizing bars are unclamped and move into the table.
18. The sizing bars are clamped.

It will be understood that the various motions and operations, as for example for positioning the die holder, displacing the die, positioning the table and effecting the impression, and other ancillary operations described above, may be carried out by other mechanisms, suitably co-ordinated. Also if desired, the dies may be returned to their case by magnetic means instead of springs, the plunger or die case cover being magnetised or comprising electromagnets and being magnetically insulated. To allow for irregularities in die depth, the table may be resiliently supported.

I claim:

1. A machine for producing spaced lines of type faced characters upon a receiving surface comprising, in combination, a unitary support carrying a plurality of type faced character bearing elements individually displaceable therein to enable any one character face to be advanced beyond the remainder, means for temporarily displacing a selected element to advance its character bearing face with respect to said unitary support, plane surface supporting means for a receiving surface capable of having characters reproduced thereon from said elements, means for effecting relative movement between said supporting means and said unitary support in a direction to form, on the said receiving surface, a character from the previously advanced character bearing element, means for effecting relative movement between the said surface supporting means and the unitary support in a direction to predetermine the position upon the said surface at which the character is formed by said first mentioned relative movement, and means for controlling said second mentioned relative movements to form spaced lines of characters upon the receiving surface.

2. A machine according to claim 1, in which the character bearing elements are normally held in the said unitary support with their character bearing faces lying in a common plane, and in which the displacing means advances and temporarily holds the selected element in a projected position with its character bearing face in advance of the said common plane.

3. A machine according to claim 1, in which the unitary support is movable in a plane to bring the selected element to a predetermined position with respect to said plane, and the supporting means for the receiving surface is movable in a parallel plane whereby a desired point on said surface may be brought opposite the aforesaid predetermined position.

4. A machine according to claim 1, comprising means for moving the supporting means for the receiving surface transversely to its plane for forming a character from the previously advanced character bearing element, and means for maintaining the said element in advanced position during character formation.

5. A machine according to claim 4, comprising a plunger device for effecting the preliminary displacement of the selected element and for maintaining the same in advanced position.

6. A machine according to claim 1, in which the relative movement between the unitary support and the supporting means for predetermining the position of character formation is effected by means controlled from a perforated strip previously prepared on a composing machine.

7. A machine according to claim 6, in which the said relative movement is effected by pneumatically actuated means.

8. A machine according to claim 6, in which said relative movement is effected by pneumatically actuated means utilizing the existing mechanism on single-type composing machines employed for line collection.

9. A machine according to claim 1, in which the unitary support is movable in a plane to bring the selected element to a predetermined position with respect to said plane, and the supporting means for the receiving surface is movable in a parallel plane whereby a desired point on said surface may be brought opposite the aforesaid predetermined position, and the unitary support is displaced for the positioning of a selected element by means controlled from a perforated strip previously prepared on a composing machine.

10. A machine as claimed in claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element.

11. A machine according to claim 10, comprising means for locking the table to the rising and falling frame and for subsequently unlocking such means to permit displacement of the table to the next position.

12. A machine as claimed in claim 11, in which the locking means comprise wedge mechanisms controlled by cam means.

13. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, and in which manually operable means is provided for interrupting the rising and falling movement of the frame.

14. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, said machine comprising resilient actuating means for effecting movement of the table in line length direction and previously settable stop means for controlling said movement.

15. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, said machine comprising resilient actuating means for effecting movement of the table in line length direction and previously settable stop means for controlling said movement, the setting of the table in the required position being effected with the aid of sizing bars which are pushed into the table to an extent appropriate to the determination of the subsequent table displacement, and means being provided for clamping the sizing bars to the table.

16. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, and in which setting of the table in line depth direction is effected with the aid of point bars which can be displaced relative to the tie bars to an extent appropriate to the determination of the subsequent table displacement, and means is provided for clamping said bars to the tie bars.

17. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, and in which setting of the table in line depth direction is effected with the aid of point bars which can be displaced relative to the tie bars to an extent appropriate to the determination of the subsequent table displacement, means being provided for clamping said bars to the tie bars, and said machine comprising a micrometer arrangement for setting the relative displacement of the said bars.

18. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, in which setting of the table in line depth direction is effected with the aid of point bars which can be displaced relative to the tie bars to an extent appropriate to the determination of the subsequent table displacement, means being provided for clamping said bars to the tie bars, and in which movement of the table is determined by abutments in conjunction with packing pieces which are engaged by means on the point bars.

19. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, in which setting of the table in line depth direction is effected with the aid of point bars which can be displaced relative to the tie bars to an extent appropriate to the determination of the subsequent table displacement, means being provided for clamping said bars to the tie bars, and in which abutment means determines the travel of the clamped point bars when the table is released and said abutment means includes an interposed member comprising two or more packing pieces of different thicknesses, the said member being adjustable so that a selected thickness can be interposed.

20. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, and means for effecting vertical movement of the rising and falling frame to effect engagement between the receiving surface and the character bearing face of a previously advanced element, setting of the table in line depth direction being effected with the aid of point bars which can be displaced relative to the tie bars to an extent appropriate to the determination of the subsequent table displacement, and in which movement of the table is determined by abutments in conjunction with packing pieces which are engaged by means on the point bars, the packing pieces having a portion of reduced thickness which packing pieces are displaceable by pneumatic means controlled by the known composing machine to vary the table travel.

21. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, means for effecting vertical movement of the rising and falling frame to effect engagement between the receiving surface and the character bearing face of a previously advanced element, and means for locking the table to the rising and falling frame and for subsequently unlocking such means to permit displacement of the table to the next position, said machine including manually operable means for releasing the locking means to enable the table to be moved by hand.

22. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, means for effecting vertical movement of the rising and falling frame to effect engagement between the receiving surface and the character bearing face of a previously advanced element, and means for locking the table to the rising and falling frame and for subsequently unlocking such means to permit displacement of the table to the next position, said machine including means engageable by the table when moving in line length direction for interrupting the drive of the machine when the table reaches a predetermined limit position.

23. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, means for effecting vertical movement of the rising and falling frame to effect engagement between the receiving surface and the character bearing face of a previously advanced element, and means for locking the table to the rising and falling frame and for subsequently unlocking such means to permit displacement of the table to the next position, said machine comprising also a displaceable justification frame arranged to be actuated by the trip rod of the known composing machine, said frame being arranged to actuate means whereby during the single justification operation the locking means for the table are clamped and the operation of the table rise and fall mechanism is interrupted.

24. A machine according to claim 1, in which the receiving surface supporting means comprises a table slidably supported upon a set of bars, tie bars connecting the ends of said bars, a rising and falling frame in which the said tie bars are slidably engaged, a fixed frame in which the rising and falling frame is vertically movable, means for effecting vertical movement of the rising and falling frame to effect engagement between the receiving surface and the character bearing face of a previously advanced element, and means for locking the table to the rising and falling frame and for subsequently unlocking such means to permit displacement of the table to the next position, said machine comprising a displaceable justification frame arranged to be actuated by the trip rod of the known composing machine, said frame being arranged to actuate means whereby during the single justification operation the locking means for the table are clamped and the operation of the table rise and fall mechanism is interrupted, and the justification frame being arranged so that during the double justification operation the locking means for the table are unclamped in succession, the table rise and fall mechanism being interrupted and the table displacing means being reversed so that the table is returned to starting position for a new line.

25. A machine according to claim 1, comprising perforating means for punching a hole at the beginning and end of each line of characters, the distance between the punched holes being variable.

26. A machine according to claim 1, including means for inking the face of the selected and displaced element and for cleaning the previously inked face after the character forming operation has been effected.

27. A machine according to claim 26, comprising a pivoted swinging arm carrying inking and cleaning means, and a cam arrangement for controlling the swing of the arm.

28. A machine according to claim 1, including means for feeding a printing ribbon between the face of the selected character bearing element and the receiving surface, and means for co-ordinating the feed of the ribbon with the advance displacement of the element.

29. A machine according to claim 28, including means for preventing the feed of the ribbon when a space occurs in the line of characters.

30. A machine according to claim 29, comprising means actuated by the element displacing means for detecting the absence of a normal displaced element, and ribbon clamping means actuated by said detecting means for preventing ribbon feed when a normal element has not been displaced.

31. A machine according to claim 1, including means for heating a displaced character bearing element.

32. A machine according to claim 1, including means for heating the supporting means for the receiving surface.

33. A machine according to claim 1, comprising clamp members movable in a plane at right angles to the displaced character bearing element for clamping said element during the formation of the character on the receiving surface.

34. A machine according to claim 1, comprising a frame containing the individually displaceable character bearing elements, and means for clamping said frame during the formation of the character on the receiving surface.

35. A machine according to claim 1, in which the character bearing elements comprise metal dies of elongated form contained in a frame and arranged so that they can be individually displaced to project from said frame, and spring means for returning the dies to the frame after displacement.

36. A machine according to claim 35, in which each die face is constituted by an element of type received within a hollow die body, and spring means is provided for retaining the type element in position in the body.

37. A machine according to claim 1, comprising a displaceable support for the character bearing elements and means for varying the distance by which the individual elements are projected from the support in accordance with the position of the support.

38. A machine according to claim 37, in which the projection distance of the element is determined by an abutment engaged by a member which effects such projection, and such abutment includes a wedge member which is moved in accordance with the movements of the support to vary the projection distance.

HENRY GEORGE CROUCHER.

References Cited in the file of this patent

UNITED STATES PATENTS

| Number | Name | Date |
|---|---|---|
| 587,816 | Heath | Aug. 10, 1897 |
| 642,263 | Sears | Jan. 30, 1900 |
| 1,221,429 | Elmblad | Apr. 3, 1917 |
| 1,389,237 | Block | Aug. 30, 1921 |
| 2,213,831 | Bates | Sept. 3, 1940 |